July 2, 1935.   J. G. ROEHM ET AL   2,006,776
BOTTLE CAPPING MACHINE
Original Filed May 1, 1931   14 Sheets-Sheet 6
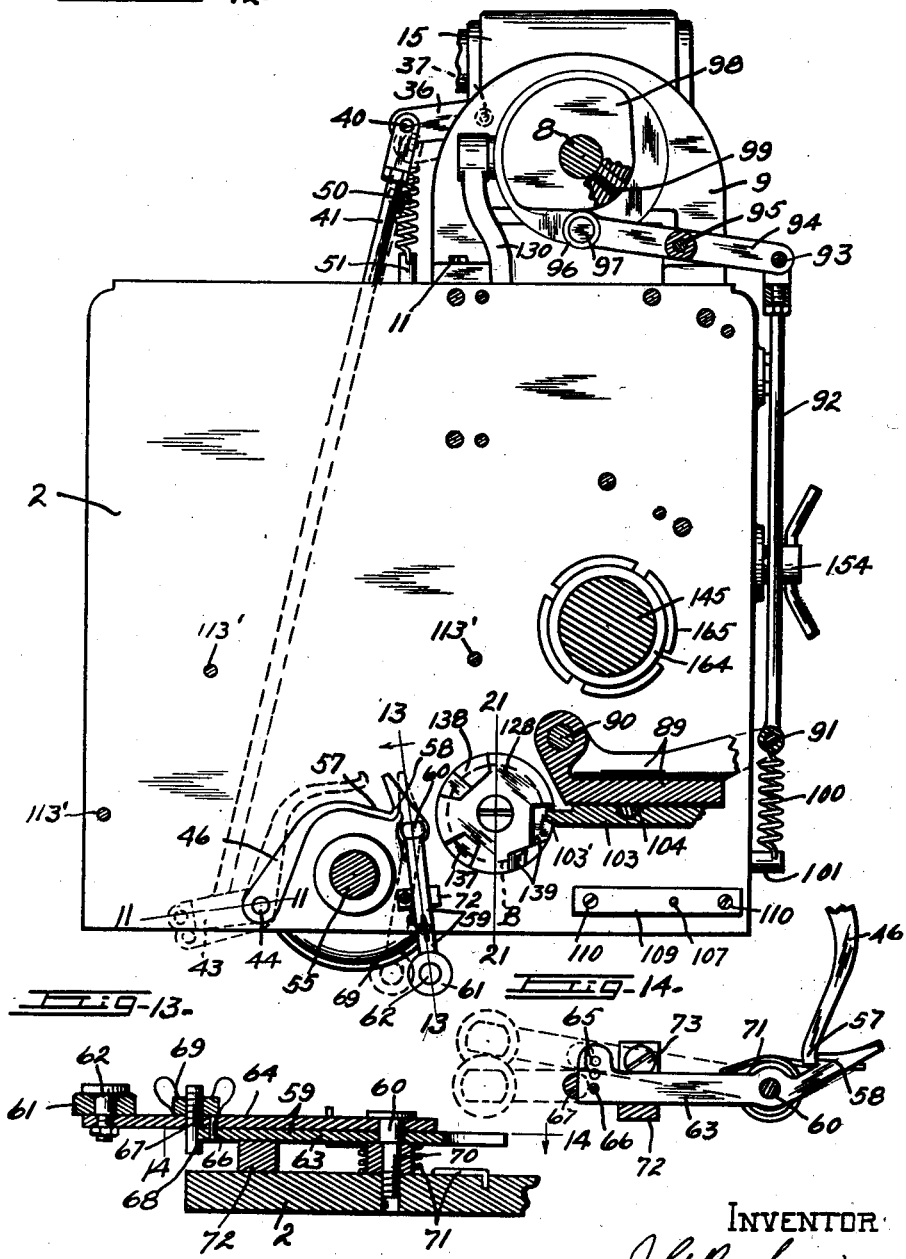

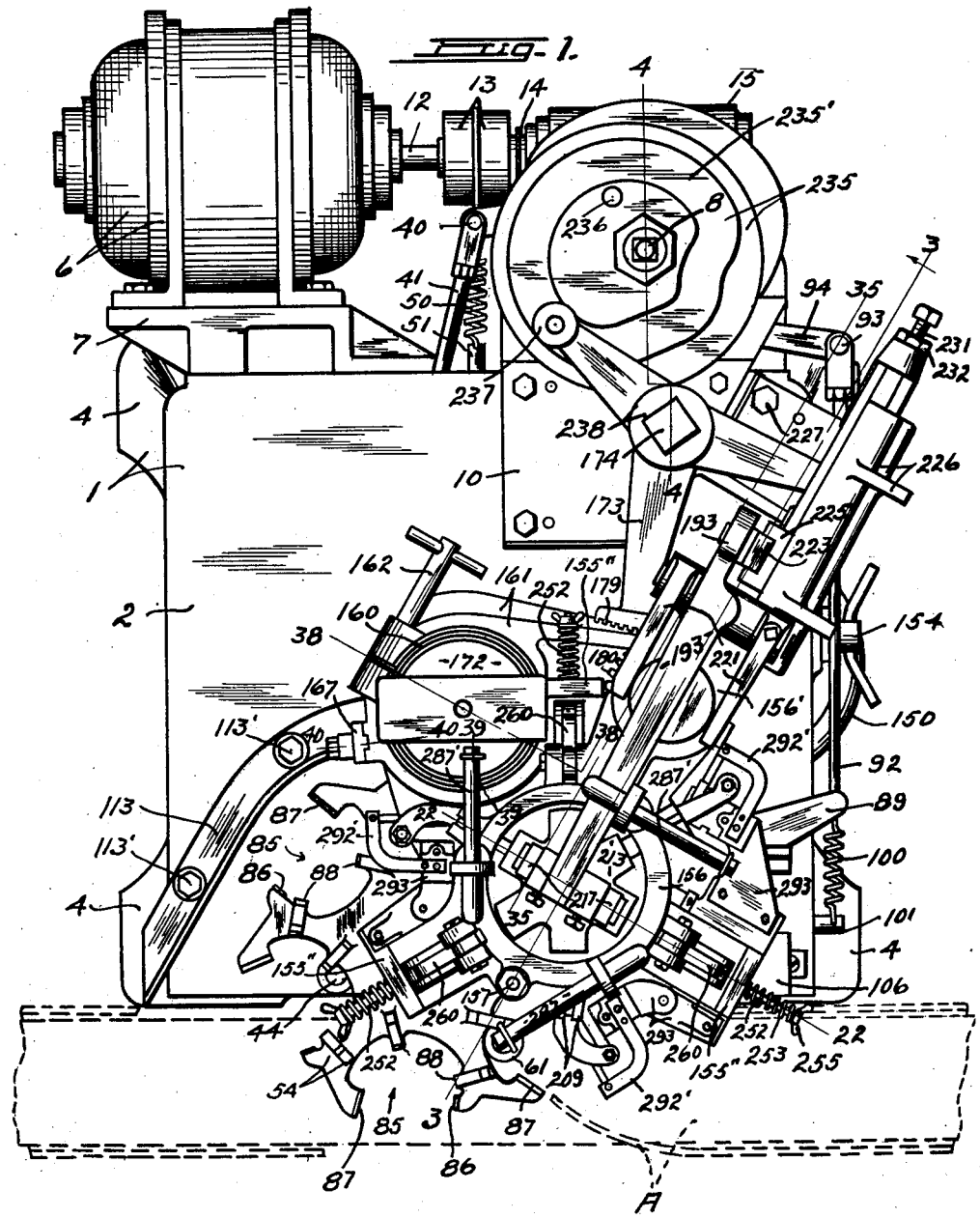

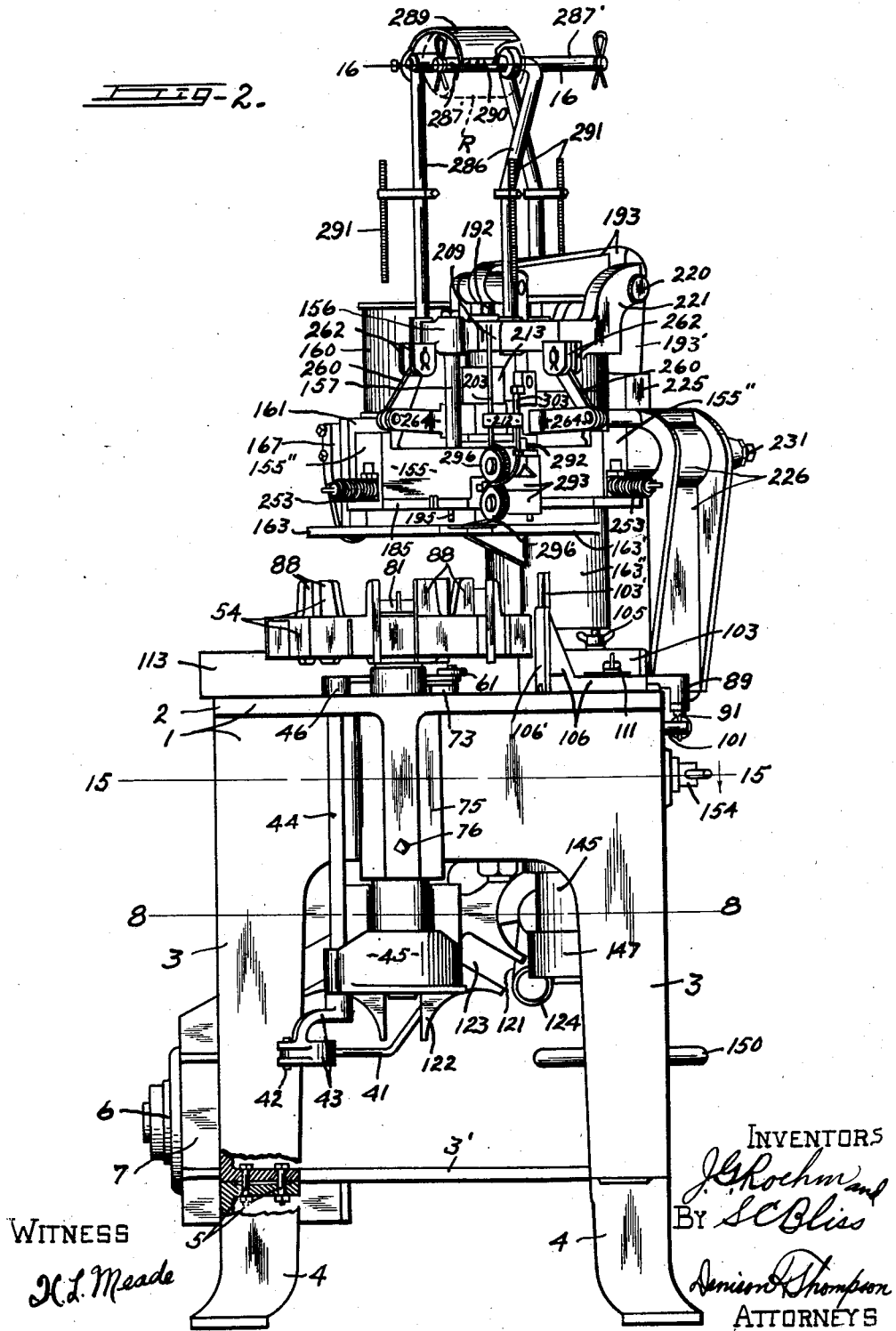

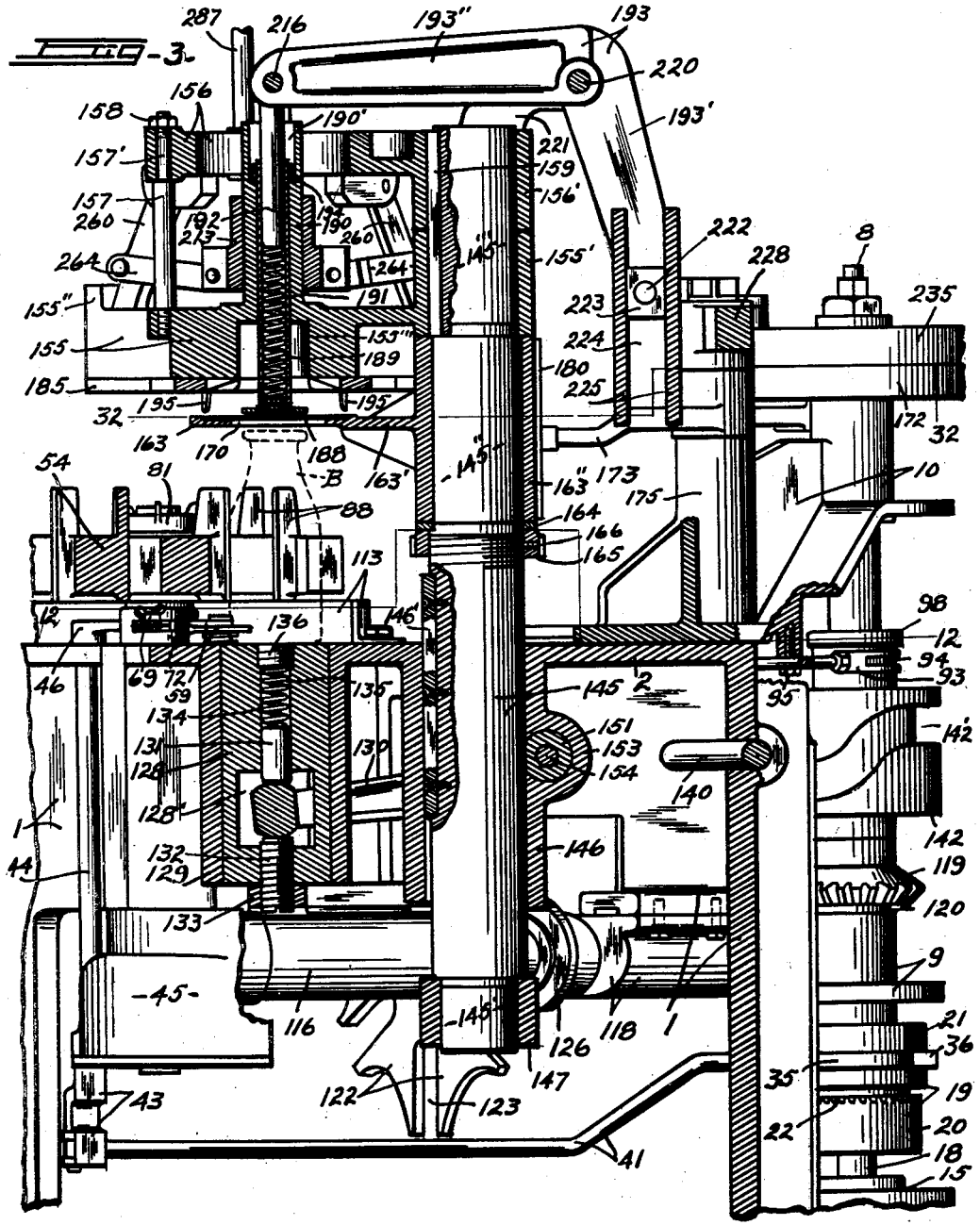

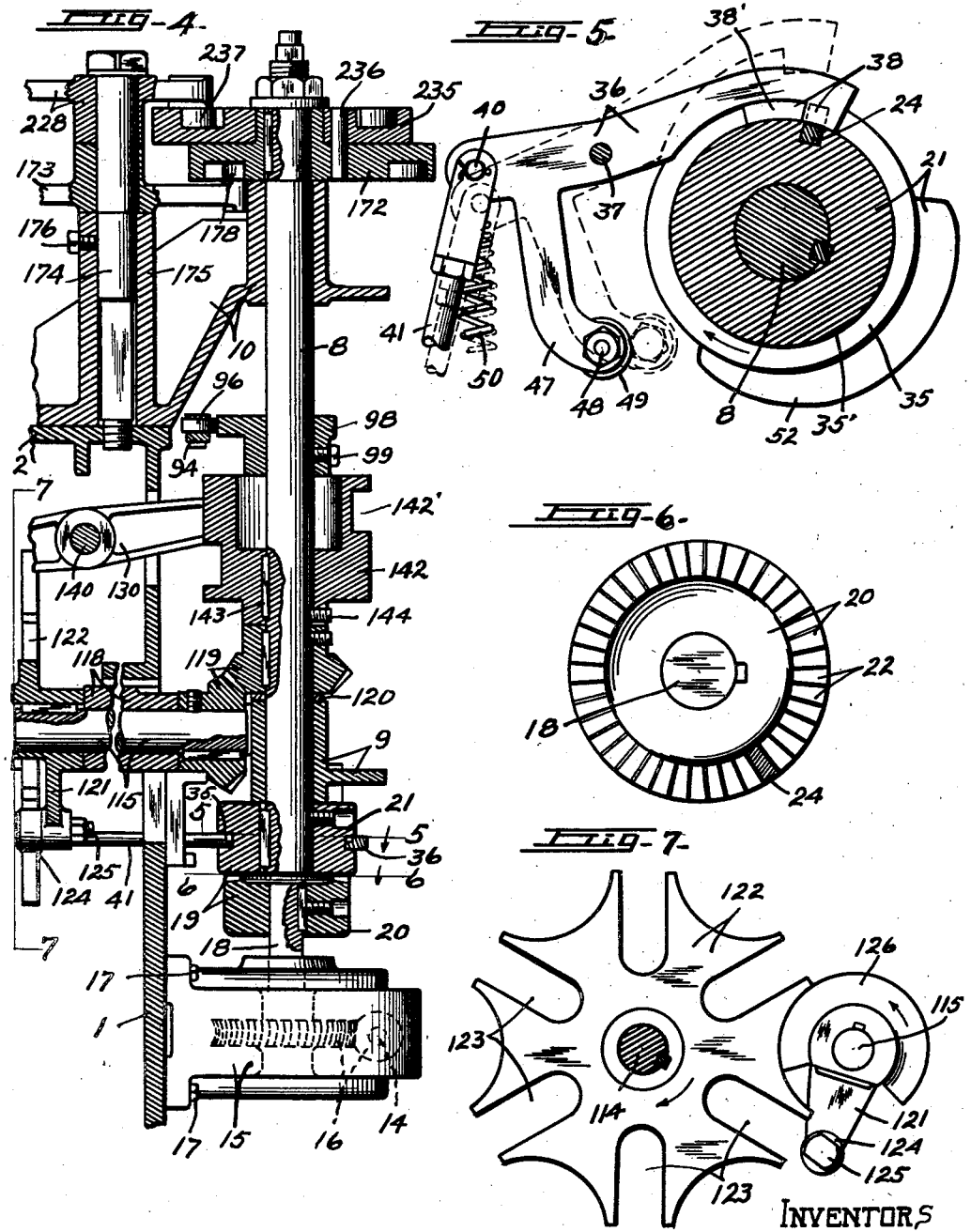

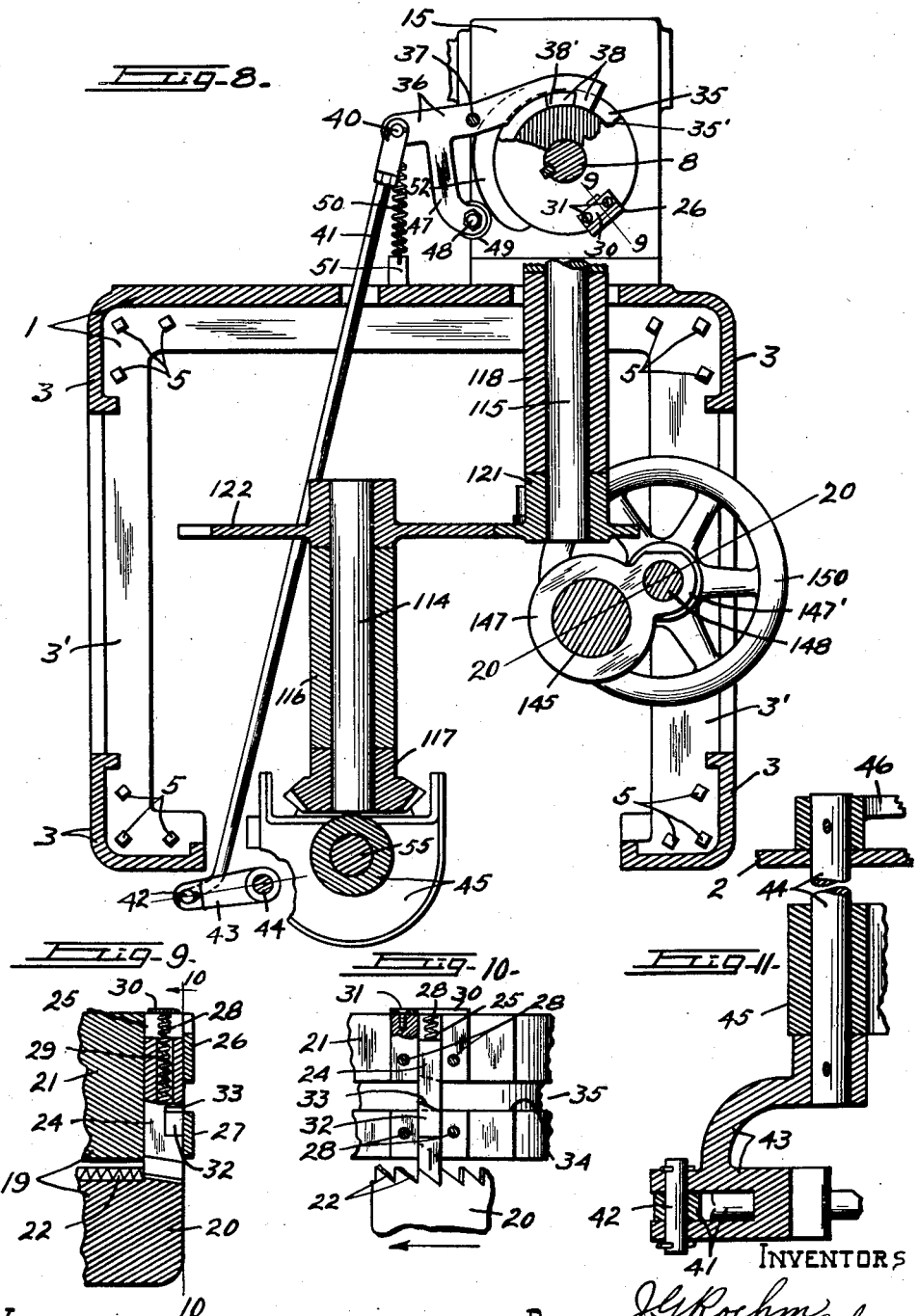

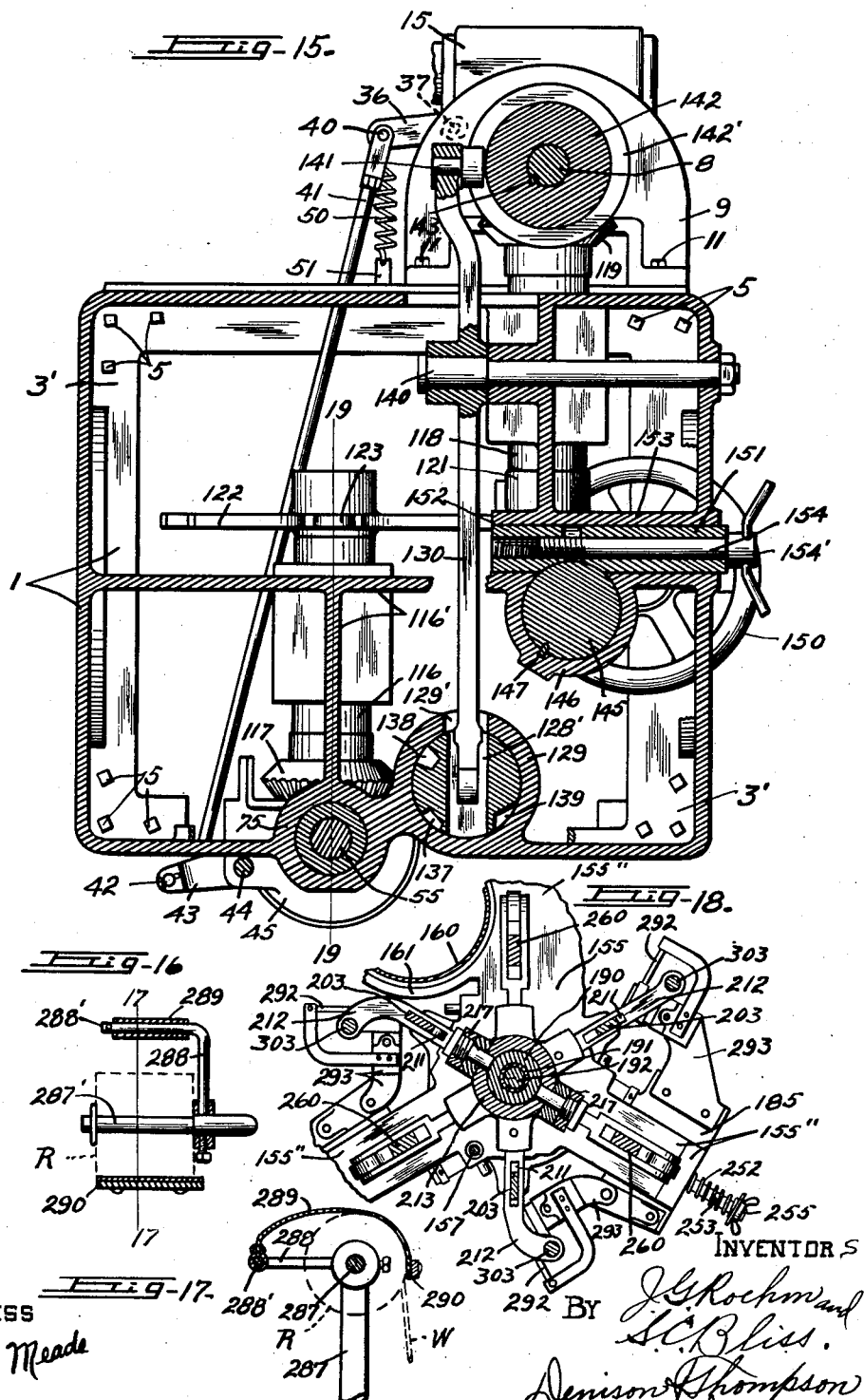

July 2, 1935. J. G. ROEHM ET AL 2,006,776
BOTTLE CAPPING MACHINE
Original Filed May 1, 1931 14 Sheets-Sheet 8
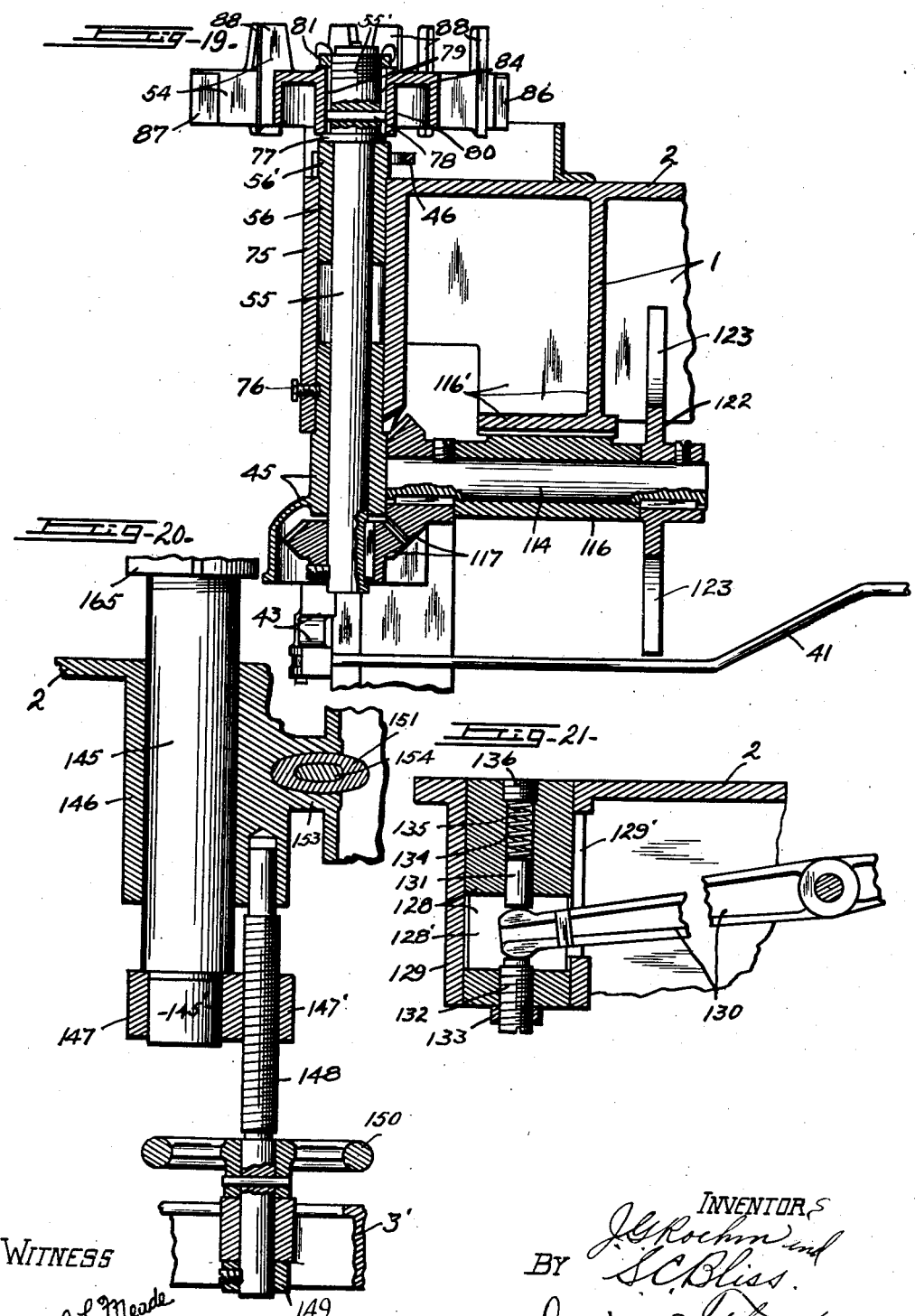

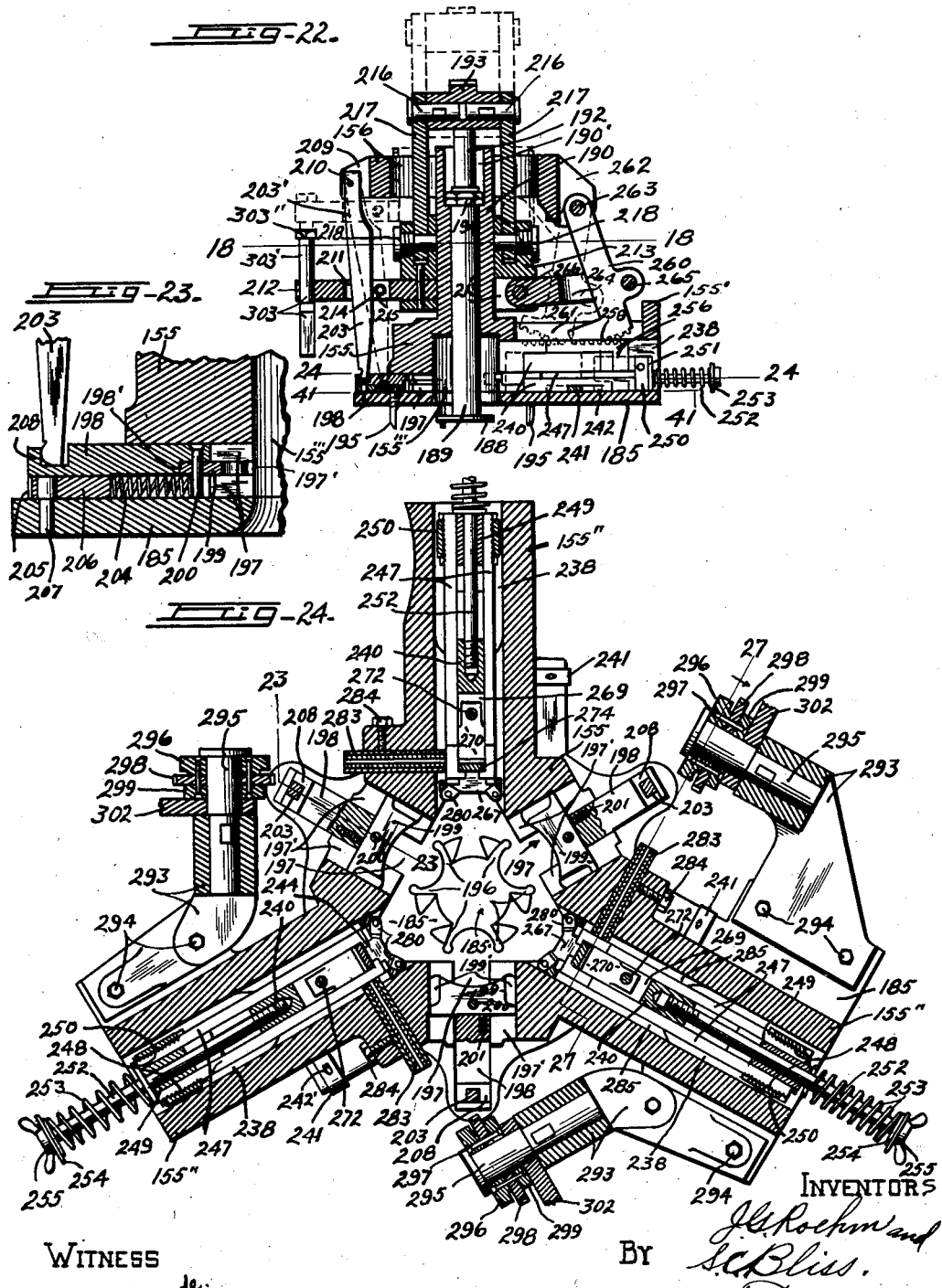

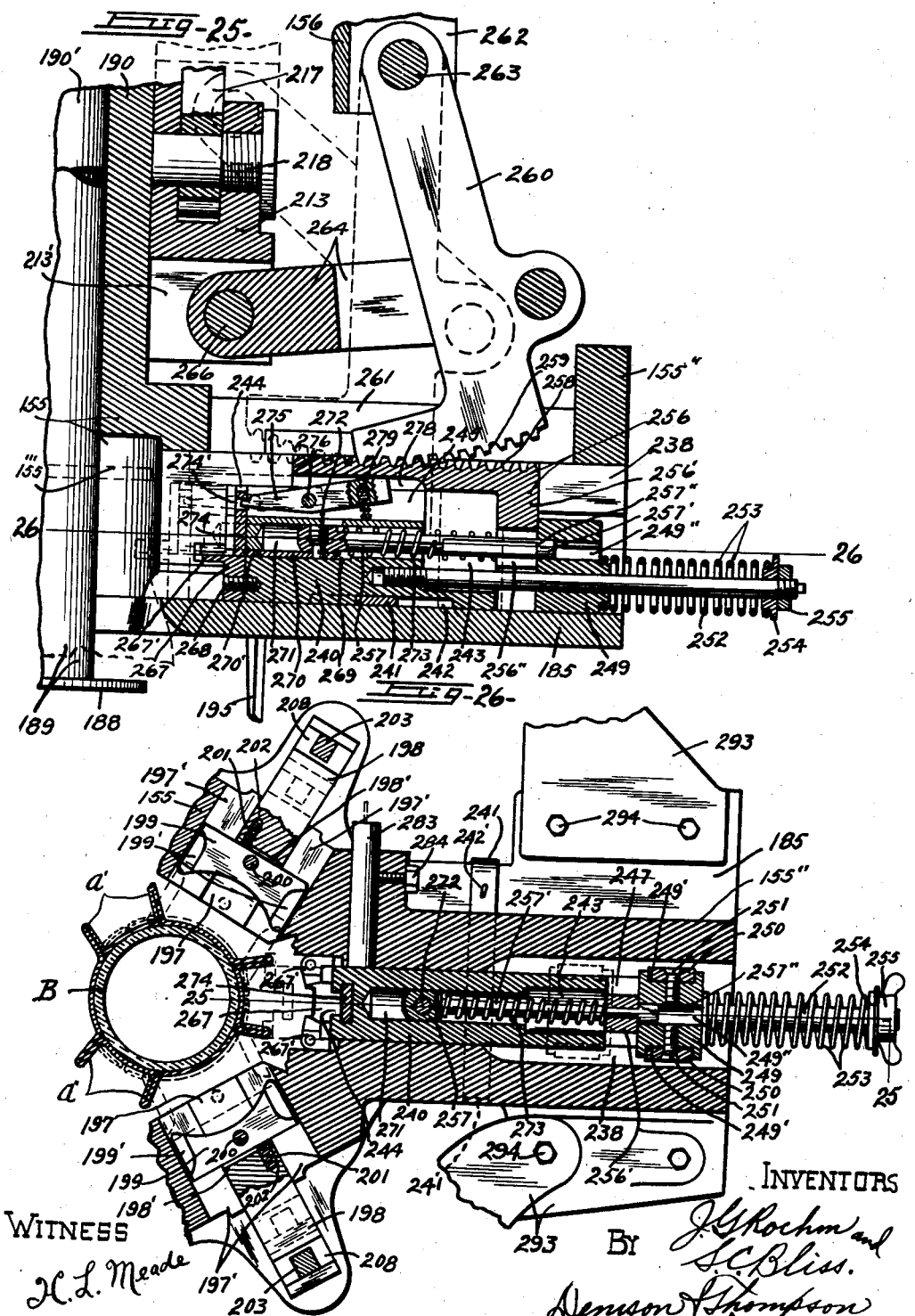

July 2, 1935.    J. G. ROEHM ET AL    2,006,776
BOTTLE CAPPING MACHINE
Original Filed May 1, 1931    14 Sheets-Sheet 11
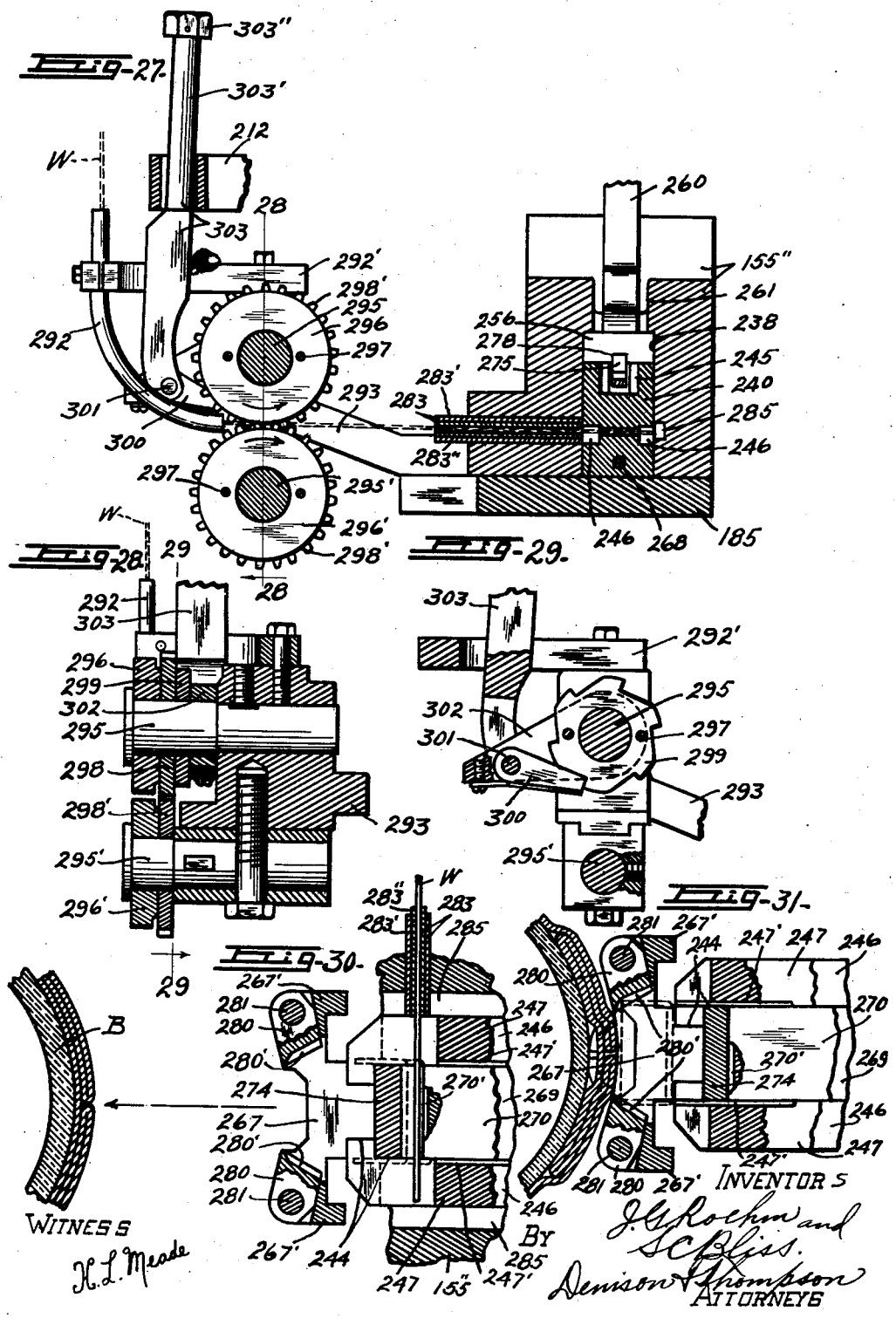

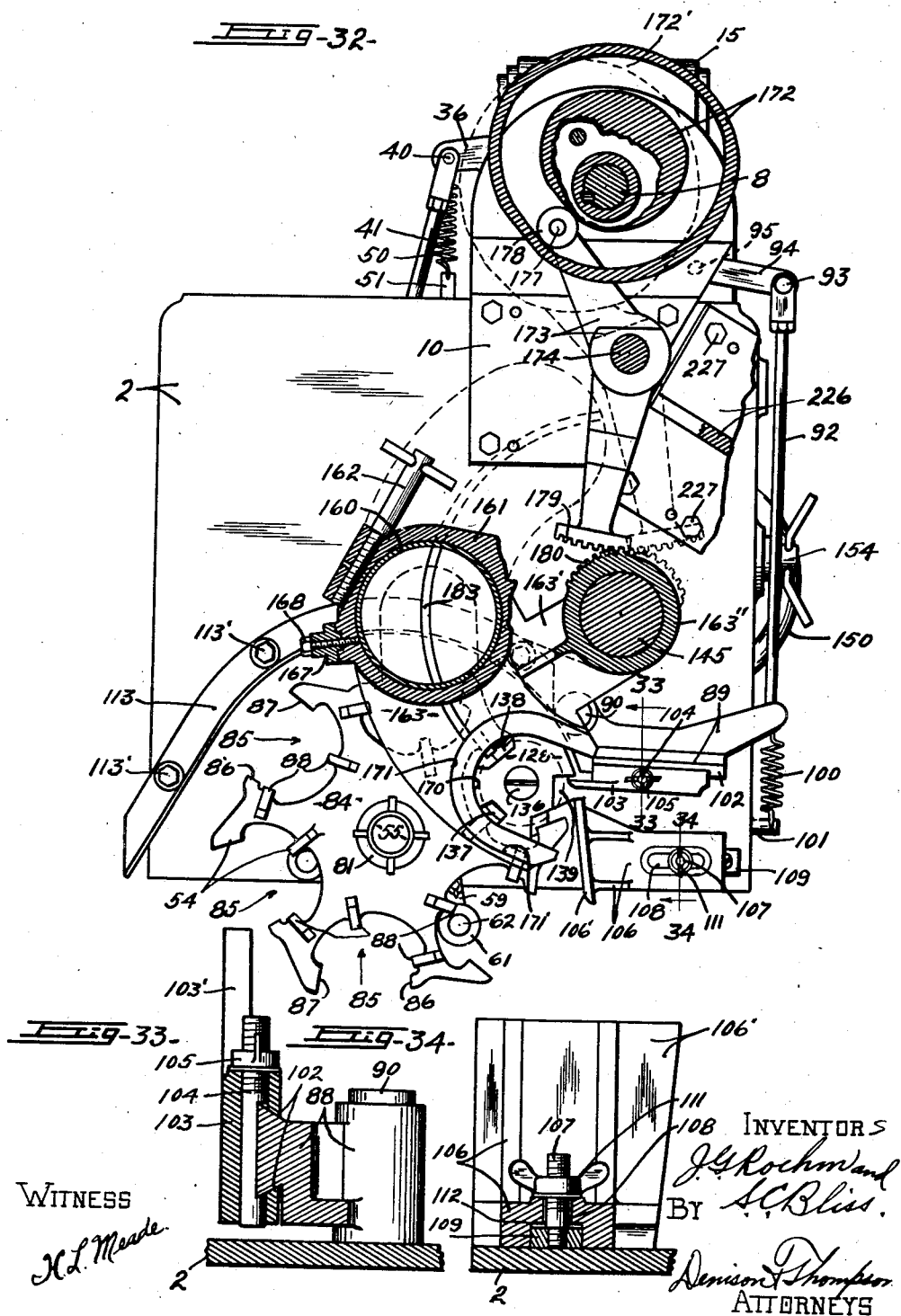

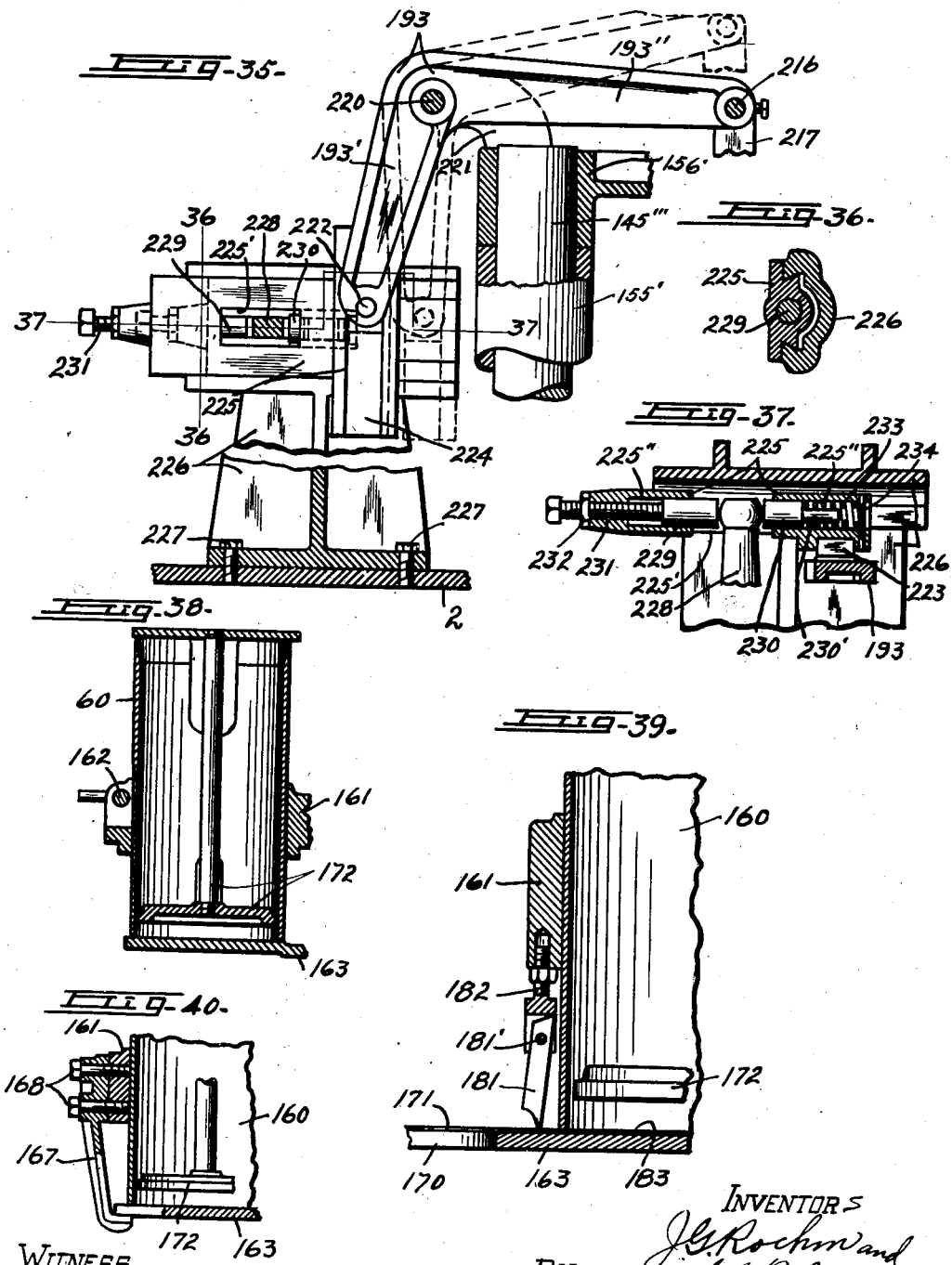

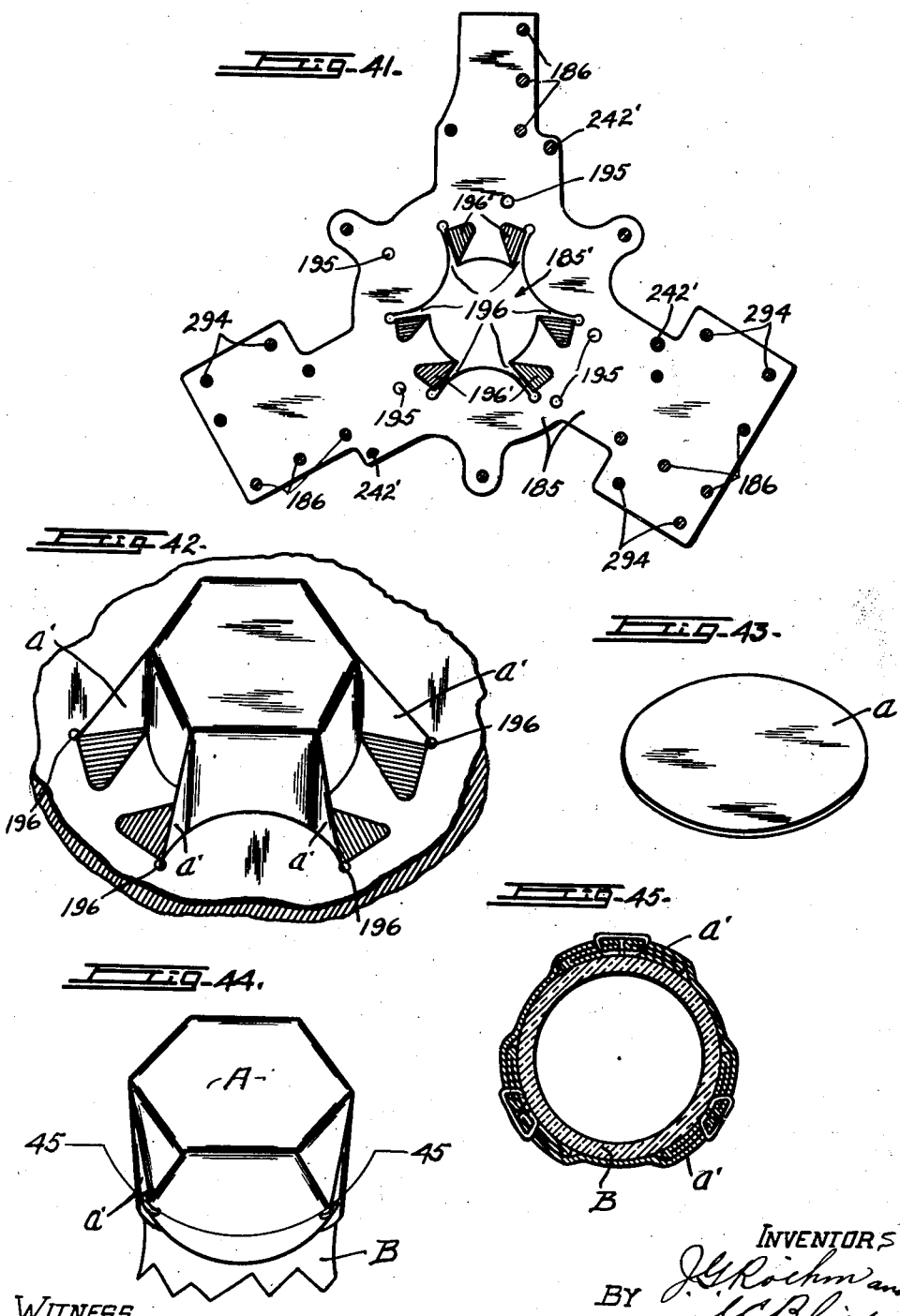

Patented July 2, 1935

2,006,776

UNITED STATES PATENT OFFICE 2,006,776

BOTTLE-CAPPING MACHINE

John George Roehm, Oneida, and Sherwood C. Bliss, Kenmore, N. Y., assignors, by mesne assignments, to Smith Hood & Seal Corporation, Syracuse, N. Y., a corporation of New York Original application May 1, 1931, Serial No. 448,950. Divided and this application November 20, 1931, Serial No. 576,328

6 Claims. (Cl. 1—2)

This invention relates to new and useful improvements in bottle-capping machines and pertains more particularly to a machine adapted to form and secure a skirted cap over the mouth and around the neck of milk bottles, or the like, for maintaining the mouth of the bottles in a wholesome and sanitary condition.

This application is a division of our application on Bottle-capping machines, filed May 1st, 1931, Serial No. 448,950.

The skirted caps are preferably applied to the bottles or other containers after said bottles or containers have been filled and sealed by a suitable cap or cover for the purpose of preventing the wall of the mouth of the containers from being contaminated by foreign or pernicious matter during the shipping and handling thereof between the time the containers are filled and when it is desired to remove the contents of the containers for use at which time the skirted caps may be quickly and easily removed by hand, which more or less mutilates the cap and prevents its reuse without detection.

The main object of this invention is to produce an apparatus which will automatically form and apply the skirted caps to bottles or other containers successively and with great rapidity so that the containers may receive the skirted caps as expeditiously as the standard form of caps or covers are applied thereto by a conventional capping machine.

Another object is to provide means whereby a disc composed of paper or other suitable capforming material, is brought over the mouth of the bottle and then automatically folded into a skirted cap in such manner by the movement of the bottle and capping mechanism towards each other that the skirt of the cap will be folded about the neck of the bottle.

A further object is to firmly secure the folded skirt of the cap about the neck of the bottle by means of a stapling apparatus connected with the machine and by utilizing the resistance of the neck of the bottle for clenching the staples as they are driven through the folds of the skirt of the cap.

Still another object is to provide a stapling means whereby the ends of each staple will be bent inwardly towards each other when the staple is clinched.

A still further object is to provide means whereby the bottle-supporting mechanism and the capping mechanism may be relatively adjusted to permit the machine to be used in capping bottles of different sizes and capacities.

Other objects and advantages relating to the details of the structure and the form and relation of the parts thereof will more fully appear in the following description taken in connection with the accompanying drawings wherein:—

Figure 1 is a top plan of a machine embodying the various features of this invention.

Figure 2 is a front elevation of the machine as disclosed in Figure 1.

Figure 3 is an enlarged detail vertical section taken in the plane of the line 3—3, Figure 1.

Figure 4 is a detail vertical section through the cam shaft taken in the plane of the line 4—4, Figure 1.

Figure 5 is a detail section taken in the plane of the line 5—5, Figure 4, with the cam section moved to the inoperative or at rest position.

Figure 6 is a face view of the drive clutch section taken in the plane of the line 6—6, Figure 4.

Figure 7 is a sectional view taken on line 7—7, Figure 4.

Figure 8 is a horizontal sectional view taken in the plane of the line 8—8, Figure 2.

Figure 9 is a detail section through one side of the clutch member taken in the plane of the line 9—9, Figure 8.

Figure 10 is a vertical section taken on line 10—10, Figure 9.

Figure 11 is a detail vertical section taken on the line 11—11, Figure 12.

Figure 12 is a horizontal sectional view taken substantially in the plane of the line 12—12, Figure 3.

Figure 13 is a detail section taken on line 13—13, Figure 12.

Figure 14 is a section taken on line 14—14, Figure 13.

Figure 15 is a horizontal sectional view taken in the plane of the line 15—15, Figure 2.

Figure 16 is a detail section taken on the line 16—16, Figure 2.

Figure 17 is a detail cross section taken on line 17—17, Figure 16.

Figure 18 is a detail horizontal sectional view taken in the plane of the line 18—18, Figure 22.

Figure 19 is a detail vertical sectional view taken in the plane of the line 19—19, Figure 15.

Figure 20 is a detail vertical section taken on line 20—20, Figure 8.

Figure 21 is a detail vertical section through the bottle lifting plunger taken on line 21—21, Figure 12.

Figure 22 is a detail vertical section of the bottle-capping mechanism taken on line 22—22, Figure 1.

Figure 23 is an enlarged detail section taken on line 23—23, Figure 24.

Figure 24 is an enlarged horizontal section taken through the stapling and folding mechanism in the plane of the line 24—24, Figure 22.

Figure 25 is an enlarged detail vertical section through one of the stapling mechanisms, taken in the plane of the line 25—25, Figure 26.

Figure 26 is a horizontal detail section taken in the plane of the line 26—26, Figure 25, with the neck of a bottle having a skirt of a cap in section in plait-folding and stapling relation therewith.

Figure 27 is an enlarged detail section through the wire driving mechanism taken on line 27—27, Figure 24.

Figure 28 is a vertical section taken on line 28—28, Figure 27.

Figure 29 is a sectional view taken on line 29—29, Figure 28.

Figures 30 and 31 are enlarged detail horizontal sections of the forward end of one of the stapling devices illustrating respectively the manner in which the staple is cut and formed and driven into the folds of the bottle cap.

Figure 32 is a horizontal sectional view taken in the plane of the line 32—32, Figure 3.

Figures 33 and 34 are detail cross sectional views taken respectively on lines 33—33 and 34—34, Figure 32.

Figure 35 is a detail section taken on line 35—35, Figure 1, showing a face view of the bottle-capping operating lever and the cross-head connected therewith.

Figures 36 and 37 are detail sectional views taken respectively on lines 36—36 and 37—37, Figure 35.

Figures 38, 39 and 40 are sectional views through the cap disc magazine taken respectively on lines 38—38, 39—39 and 40—40, Figure 1.

Figure 41 is a plan view of the pleat-forming plate taken on line 41—41, Figure 22.

Figure 42 is a fragmentary perspective view of the pleat-forming plate illustrating the manner in which the skirt of the cap is pleated.

Figure 43 is a perspective view of one of the cap-forming discs.

Figure 44 is a perspective view of the completed cap formed upon the mouth of the bottle.

Figure 45 is a sectional view taken on line 45—45, Figure 44, in the plane of the staples.

As illustrated in the drawings, this machine is constructed to automatically cap one bottle at a time and is adapted to be placed at any convenient location adjacent to and in co-operative relation with the usual conveyor used in transporting the bottles from a conventional capping machine to receive the bottles from said conveyor, and after applying the skirted caps thereto to return the bottles to the conveyor or other suitable carrier preparatory to crating and shipping the bottles.

The device consists of a frame having a motor, a cam shaft and a bottle carrier construction connected therewith to operate in fixed relation to the frame and to each other and a bottle-capping mechanism adjustably mounted on the frame in co-operative relation with the cam shaft and bottle carrier construction and adapted to be adjusted relative thereto to permit the capping of bottles of different sizes and capacities.

The frame as 1 is preferably comprised of a bed plate 2 supported upon a plurality of, in this instance, four vertically disposed legs 3 positioned at respective corners of the plate 2. Each of the legs 3 may, as shown, be provided with an extension 4 removably secured to the bottom face of the legs by bolts 5. The leg extensions 4 are for the purpose of positioning the bed plate 2 in co-operative relation with a conveyor as A, Figure 1 used for transporting the bottles from a conventional bottle-capping machine and, therefore, the length of said extensions necessarily depends upon the distance the conveyor is positioned from the floor.

The various units of the machine may be driven in any suitable manner and for this purpose there is shown an electric motor as 6 mounted on a bracket 7 which is secured to the rear face of one of the legs 3 near one side of the frame 1 for operating a cam shaft 8 which is journaled in a vertical plane near the other side of the frame 1, in a pair of brackets 9 and 10.

The brackets 9 and 10 are mounted in spaced relation with one of the brackets as 9, positioned near the lower end of the cam shaft 8 and secured by screws 11 or otherwise to the rear face of the frame 1 while the bracket 10 is secured to the upper rear face of the bed plate 2 and extends upwardly and rearwardly therefrom to form the bearing support for the upper end of the cam shaft 8.

The motor 6 is operably connected with the cam shaft 8 in the following manner: The armature shaft 12 of the motor is connected by a flexible coupling 13 to the driven shaft 14 of a speed reducing unit 15 composed of the required gear train 16 as the worm and gear to obtain the desired speed of the cam shaft 8.

The speed reducing unit 15 is secured by bolts or screws 17 to the rear face of one of the legs 3 of the frame 1 with the drive shaft 18 thereof positioned co-axially with the cam shaft 8 with which the drive shaft 18 is releasably connected by means of a clutch member 19 mounted on the adjacent ends of the cam shaft and said drive shaft.

The clutch 19, in this instance, consists of an annular drive section 20 secured in any suitable manner to the upper end of the drive shaft 18 and a companion annular driven section 21 secured to the lower end of the cam shaft 8, as more clearly illustrated in Figure 4.

The upper face of the drive section 20 of the clutch 19 is provided with a slightly raised annular portion which is serrated to form ratchet teeth 22 formed with the upper faces thereof beveled for the purpose of driving the clutch section 21 in one direction only. The driven section 21 is releasably connected with the drive section 20 by means of a latch member 24 which is slidably mounted in a vertically disposed slot 25 provided in the periphery of the driven clutch section 21 (see Figures 5, 6, 8, 9 and 10).

The clutch latch 24 is held in the slot against lateral displacement by means of a pair of guide plates 26 and 27 secured by screws 28 in spaced relation to the periphery of the driven clutch section 21. The lower end of the latch 24 is beveled to conform to the face of the teeth 22 with which the latch is normally yieldingly held in engagement by a coil spring 28 positioned in a vertically disposed hole 29 provided in the upper end of the latch 24 with the upper end of the spring contacting with a spring retaining plate 30 positioned over the slot 25 and secured by screws 31 to the upper face of the driven clutch section 21.

The outer vertical edge of the latch member 24 is provided with a slot 32 which has the upper wall 33 thereof slightly beveled upwardly and forwardly with the rear lower edge of said beveled wall registering when in the clutching position with the lower wall 34 of an annular groove 35 provided in the periphery of the driven clutch section 21 in registering alignment with the adjacent ends of the plates 26 and 27. The groove 35 is substantially the same depth as the slot 32 in the latch 24 and is adapted to receive therein one end of a latch releasing lever 36 which is pivotally connected at 37 to the lower face of the lower positioned cam shaft bracket 9.

The end of the latch release lever 36 adapted to engage the groove 35, has the inner edge thereof provided with an inwardly projecting flange 38 which is substantially the same width as said groove and has the inner vertical edge thereof slightly concave to conform to and engage the inner vertical wall 35' of the groove 35 when in the operative position in said groove.

The forward portion 38' of the upper face of the flange 38 is tapered forwardly and downwardly to form a knife edge at the forward end of the flange for engaging the tapered wall 33 of the slot 32 for lifting the latch 24 against the action of the spring 28, and thereby automatically disconnect the clutch sections by bringing the latch out of engagement with the teeth 22 of the drive clutch section, as shown by dotted lines in Figure 10 and thereby bring the cam shaft 8 and the several units driven thereby at rest when the latch release lever 36 is in the position shown by full lines in Figure 5.

The other end of the latch release lever 36 extends a short distance outwardly beyond the pivot 37 and is pivotally connected by a pin 40 to one end of a horizontally disposed connecting rod 41 which extends forwardly in a plane below the bed plate 2 with the forward end thereof pivotally connected at 42 to a bifurcated rock arm 43 which is secured to the lower end of a vertically disposed rock shaft 44.

The rock shaft 44 is journaled near its lower end in one side of a bearing member 45, hereinafter more fully explained, while the upper end of the shaft extends through and is journaled in the front portion of the bed plate 2 and has secured thereto one end of a horizontally disposed clutch release arm 46, (see Figures 11 and 12).

Intermediate the pivot 37 and the outer end of the latch release lever 36 is an integral forwardly extending arm 47 which has the forward end thereof curved at substantially right angles to itself and towards the cam shaft 8 and has a stud 48 secured thereto upon which is rotatably mounted a roller 49 adapted to contact with the peripheral wall of the driven cam section 21 for limiting the outward movement of the latch engaging end 38 of the latch release lever 36.

The roller 49 is yieldingly maintained in contact with the clutch section 21 by a tension spring 50 connected at one end to the pin 40 and at the other end to a stud 51 secured to the rear portion of the frame 1.

A cam segment 52 tapered at its forward end is secured to or made integral with the periphery of the clutch section 21 and positioned at one side of the groove 35 in the plane of travel of the roller 49 for the purpose of engaging said roller to rock the lever 36 about its pivot 37 against the action of the spring 50 and thereby restore the flange end 38 of the lever 36 to the latch releasing position within the groove 35 during a portion of a revolution of the clutch section 21 after the arm 36 has been moved by the action of the spring 50 in a manner hereinafter more fully explained, to the inoperative position, as indicated by dotted lines in Figure 5.

The clutch release arm 46 is positioned to operate in a horizontal plane between the bed plate 2 and a bottle carrier 54 with the end which is secured to the rock shaft 44 positioned at one side of a vertically disposed shaft 55 for operating the carrier 54 and which is journaled in the bearing member 45 and a second member 56 provided in the frame 1 at the forward portion thereof.

The arm 46 extends rearwardly and to the opposite side of the shaft 55 with the free end of the arm provided with a V-shaped projection or lug 57 adapted to engage a notch 58 provided near one end of a rock arm 59 which is pivotally mounted on a shouldered screw 60 secured to the bed plate 2.

The arm 59 extends forwardly from the pivotal screw 60 with the forward end thereof provided with a roller 61 rotatably mounted on a shouldered stud 62 secured to said end of the arm 59, the roller 61 being provided and positioned to be successively engaged by the bottles as they are received by the bottle carrier 54 from the conveyor A for automatically operating the clutch 19 to connect the cam shaft with the source of power, as the motor 6.

The rock arm 59, in this instance, is composed of two sections 63 and 64 adjustably mounted one upon the other (see Figures 12, 13 and 14). The lower section 63 has one end thereof extending rearwardly from the pivot 60 and provided with the notch 58 for engaging the clutch release arm 46. The other end of the arm extends forwardly from the pivotal screw 60 and is provided with a plurality of, in this instance, three apertures 65 adapted to receive a pin 66 therein. The pin 66 is secured to the upper section 64 of the arm 59 which has one end pivotally mounted on the screw 60 and the other end provided with the stud 62 and roller 61.

In assembling the arm 59, the pin 66 may be positioned in one of the apertures 65 to properly position the roller 61 depending upon the diameter of the bottles to be capped and then the two sections are clamped together by a screw 67 which is mounted in the upper arm section 64 with the lower portion of the screw provided with a slot 68 adapted to engage the end edge of the lower arm section 63. A thumb screw 69 is screw threaded on the upper end of the screw 67 for securely clamping said arm sections together.

The arm 59 is maintained in spaced relation with the bed plate 2 by a spacing collar 70 mounted on the pivotal screw 60 while the arm is yieldingly maintained in the operative position by a spring 71 coiled about the collar 70 with one end thereof secured in the bed plate 2 and the other end engaging the arm 59.

The arm 59 is maintained in the normal operative position against the action of the spring 71 by a limiting stop member 72 positioned intermediate the outer end of the arm 59 and the pivotal screw 60 and secured to the upper face of the bed plate 2 by a screw 73.

It is now evident that when the clutch release arm 46 is engaged by the rock arm 59, the clutch latch release lever 36 will be positioned with the end flange 38 in the groove 35 in the path of movement of the latch 24 for disconnecting the clutch sections and discontinuing the rotation of the cam shaft 8, as shown by full lines Figures 5, 8 and 12, said cam shaft coming to rest in the position shown in Figure 5.

As soon, however, as the arm 59 is rocked to release the clutch release arm 46, the latch release lever 36 will be rocked about the pivot 37 by the action of the spring 50 to release latch 24 which will then be moved by the spring 28 into engagement with the drive clutch section 20, thereby causing the cam shaft 8 to be rotated by the motor 6.

At the same time, the roller 49 will be brought into contact with the periphery of the clutch section 21 ahead of the cam 52, as illustrated by dotted lines, Figure 5, and in position to be engaged by the cam segment 52 which will rock the lever 36 and restore the end 38 to the latch releasing position in the groove 35 for disengaging the clutch sections at the end of the cycle and, at the same time, bring the clutch release arm 46 into holding engagement with the rock arm 59 to maintain the lever 36 in the clutch-releasing position until such time as the arm 46 is again released by the rocking of the arm 59 from any cause, as by a bottle coming into contact with the outer end thereof.

The hereinbefore mentioned bottle carrier 54 in this instance, is constructed to handle bottles of a given diameter and when bottles of a different diameter are to be capped, it is necessary to change the carrier to one adapted to handle such bottles, and for this reason, the carrier is removably mounted on the upper end of the carrier shaft 55 in a plane above the bed 2 of the frame 1, as more clearly illustrated in Figures 2, 3 and 19.

The hereinbefore mentioned bearing members 45 and 56 for the bottle carrier shaft 55 are mounted in a downwardly projecting tubular extension 75 made integral with the bed plate 2. The bearing member 45 is secured by a screw 76 in the lower end of extension 75 and extends below said extension to support the lower end of the shaft 55 while the bearing member 56 is mounted in the upper end of the extension and is provided with an enlarged portion 56' which extends above the bed plate 2.

The upper end 55' of the carrier shaft 55 extends above the bearing 56 and, in this instance, is made slightly larger in diameter than the remaining portion of the shaft and is provided with an enlarged integral annular flange 77 at the junction of the end portion 55' and the major portion of the shaft 55, said flange 77 being adapted to engage the upper end surface of the bearing 56 to limit the downward axial movement of the shaft 55.

The upper end 55' of the shaft 55 is also provided with a key 78 which extends diametrically through the shaft with the ends thereof projecting a short distance either side of the shaft for registering in respective diametrically opposed slots 79 provided in the opening in the hub 80 of the bottle carrier 54 for causing said carrier to rotate with the shaft 55 while the carrier is secured on the shaft between the flange and a wing nut 81 screw threaded on the outer end of the shaft portion 55' to prevent accidental displacement of the carrier and at the same time, provide for the quick and easy removal and changing of the carrier by simply removing the nut 81 when bottles of different diameters are to be capped, as for instance, when changing from pint bottles to quart bottles, or vice versa.

The bottle carriers 54 used in the machine are for the purpose of receiving the bottles from the conveyor A and feeding them intermittently and successively into operative alignment with a bottle-capping mechanism, hereinafter more fully described, and after the cap has been applied to return the bottles to the conveyor A.

The carrier 54 consists of a substantially flat body portion 84 having a plurality of, in this instance six, semi-circular bottle-receiving recesses 85 arranged in uniformly spaced relation circumferentially about the axis of the carrier shaft 55.

The recesses 85 are each constructed with a greater diameter than that of the bottles to be received therein and with the centers thereof lying in an arc concentric with the carrier shaft 55 and which passes through the vertical axis of the capping mechanism. Each recess 85 terminates at the outer edges thereof in a pair of spaced lugs 86 and 87 forming the mouth of the respective recess and having their opposed faces substantially parallel and spaced apart a distance slightly greater than that of the diameter of the bottle to permit the free entrance of the bottle in said recesses.

The lug 87 positioned at the rear of the respective recesses in the direction of motion of the carrier, is somewhat longer and projects outwardly farther than the other lugs 86 to provide a relatively broad surface contacting with the bottle for moving said bottle with the carrier. Each of the recesses 85 are also provided with a plurality of, in this instance two, radial arms 88 spaced at substantially ninety degrees from each other and positioned at the forward side of the respective recesses.

The arms 88 extend above the body of the carrier a short distance to form a substantial support for the bottle and have their inner vertical faces substantially perpendicular and spaced from the center of the recess a distance equal to the radius of the base of the bottle so as to position the bottle when in contact therewith concentric with the respective recess, and therefore, with the capping mechanism when the recess is in registration with said capping mechanism.

Upon each recess 85 containing a bottle to be capped being moved into registration with the bottle-capping mechanism, the bottle contained therein is brought into contact with the bottle-supporting arms 88 and, therefore, in operative alignment with the capping mechanism by means of a bottle positioning arm 89 pivotally mounted at one end to a stud 90 secured to the bed plate 2 a short distance at the rear of the axis of the capping mechanism and out of the path of movement of the bottle carrier 54.

The arm 89 extends a relatively short distance forwardly from the pivot 90 and outwardly beyond the outer adjacent edge of the frame 1 (see Figures 12, 32 and 33). The outer end of the arm 89 is pivotally connected at 91 to a rearwardly extending rod 92 which is pivotally connected at 93 to one end of a rock arm 94 which is journaled intermediate its ends on a shouldered stud 95 secured to the underside of the upper positioned cam shaft bracket 10 (see Figure 3).

A roller 96 is rotatably mounted on a stud 97 secured to the inner end of the arm 94 for engaging the periphery of a cam member 98 which is secured to the cam shaft 8 by the screw 99 to rotate therewith, the roller 96 being held in constant contact with the cam 98 by means of a tension spring 100 connected at one end to the outer end of the arm 89 and having the other end connected to a stud 101 which, in turn, is secured to the frame 1.

The front vertical face of the arm 89 is provided with opposed beveled edges 102 to form a supporting way upon which is adjustably mounted a plate 103 which projects inwardly a short distance beyond the arm 89 and has its inner vertical edge 103' extended upwardly a short distance for contacting with and moving the bottle into contact with the positioning arms 88 of the respective recess 85 of the carrier 54. This positioning operation of the bottle is effected each time a recess appears in registration with the bottle-capping mechanism by the movement as the arm 89 is actuated by the cam 98 during each revolution of the cam shaft 8.

The plate 103 is adjustably clamped to the arm 89 by a clamping bolt 104 which extends through a vertically disposed aperture provided in the plate 103 intermediate the ends thereof, said bolt 104, in this instance, having a portion of one side thereof formed with a slot adapted to receive the way and being provided with a thumb nut 105 screw threaded on the upper end thereof, the plate 103 being adjustably clamped to the arm 89 to permit the positioning of the plate for bottles of different diameters.

A bottle guide bracket 106 is clamped to the forward portion of the bed plate 2 to assist in guiding the bottle as it is moved by the carrier 54 from the conveyor A into registration with the bottle-capping mechanism and, for this purpose, the bracket 106 has its inner vertical edge 106' extended upwardly to form a substantial guide for the bottles.

The bracket is adjustably clamped to the bed 2 for guiding bottles of different diameters by a stud 107 positioned in an elongated slot 108 formed in the bracket 106 and having one end thereof screw threaded in a bar 109 which, in turn, is secured to the bed plate 2 by screws 110, said stud 107 being provided with a wing nut 111 screw threaded on the outer end thereof for clamping the bracket 106 in a predetermined position. The bar 110 also registers in a suitable longitudinal groove 112 provided in the lower face of the bracket 106 for maintaining said bracket against pivotal movement about the stud 107. A curved guide bar 113 L-shaped in cross section is secured by screws 113' or their equivalent to the upper face of the bed plate 2 in spaced relation to and substantially concentric with the rear portion of the bottle carrier 54. The guide bar extends from the vicinity of the arm 89 to the front face of the bed plate 2 for guiding the bottles as they are moved by the carrier 54 from the capping position to the conveyor A (see Figures 1 and 32).

The bottle carrier 54 is intermittently rotated the distance between two adjacent bottle-receiving recesses 85 by the cam shaft 8 at each revolution of the shaft in the following manner:

Two shafts 114 and 115 are disposed in parallel spaced relation in substantially the same horizontal plane longitudinally of the frame 1 and below the bed plate 2.

The forwardly positioned shaft 114 is journaled in a bearing 116 secured to a bearing supporting bracket 116' secured to or made integral with the frame 1. The shaft 114 extends from the carrier shaft 55 rearwardly to a position intermediate the front and rear of the frame 1 and is operatively connected with the carrier shaft 55 by a pair of beveled gears 117 (see Figures 8 and 19), one of which is secured to the forward end of the shaft 113 and the other one to the lower end of the carrier shaft 55. The other horizontal shaft 115 is journaled in a bearing member 118 mounted at and secured to the rear portion of the frame 1, said shaft 115 being operably connected to the cam shaft 8 by means of a pair of beveled gears 119 (see Figure 4), one of said gears being connected to the rear end of the shaft 115 and the other gear to the cam shaft 8 in a plane above the lower bearing bracket 9 and spaced therefrom by means of a thrust washer 120 for preventing downward axial movement of the cam shaft 8.

The shaft 115 extends forwardly from the cam shaft 8 to the vicinity of the inner end of the shaft 114 and has a crank arm 121 secured thereto to rotate therewith and adapted to engage an indexing member as a star wheel 122 secured to the inner end of the shaft 114 to rotate therewith.

The star wheel 122 is provided with a plurality of, in this instance six, radial slots 123 (see Figure 7) extending from the periphery inwardly and adapted to receive therein a roller as 124 pivotally mounted on a stud 125 secured to the free end of the crank arm 121 so that upon each revolution of the shaft 115 and crank arm 121, the shaft 114 will be moved the distance between two adjacent slots 123 or, in this instance, one-sixth of a revolution by the action of the arm 121.

The peripheral face of the wheel 122 intermediate the radial slots 123 are concaved for receiving an annular disc 126 having a corresponding convex surface and secured or made integral with the crank arm 121 for maintaining said wheel in fixed position when not engaged by the roller 124.

It is now evident that any rotary motion of the cam shaft 8 will be transmitted through the beveled gears 119 to the horizontal shaft 115 which, in turn, transmits an intermittent rotary motion to the shaft 114 through the medium of the crank arm 121 and the star wheel 122 at each revolution of the shaft 115 and this intermittent motion is transmitted to the bottle carrier 54 through the beveled gears 117 and carrier shaft 55.

Associated with the bottle carrier 54 is a bottle supporting cylindrical plunger 128 mounted for vertical reciprocative movement in a pendant vertically elongated hollow boss or bearing 129 made integral with the bed plate 2, Figures 3, 12 and 15, and positioned at the rear and to one side of the carrier supporting shaft 55 in co-operative alignment with one of the bottle-receiving recesses 85 of the carrier 54 so that the bottle, when moved by the carrier from the conveyor A, will come to rest upon the plunger 128 which when in the normal down position has the upper end surface thereof in the plane of the upper surface of the bed plate 2.

The plunger 128 is moved vertically to force the bottle to and from its cap-receiving position and, for this purpose, said plunger is provided with a diametrically disposed slot 128' positioned near the lower end thereof for receiving one end of a substantially horizontally disposed rearwardly extending rock arm 130. The forward end of the rock arm 130 enters the slot 128' through a vertically disposed slot 129' formed in the rear wall of the boss 129 in registration with the slot 128' in the plunger 128.

The end of the arm 130 disposed in the plunger slot 128' is of less vertical height than said slot and has the upper and lower surface thereof curved longitudinally to contact with adjacent ends of a vertically disposed pin 131 and screw 132.

The screw 132 is screw threaded in the lower end of the plunger and secured therein by a lock nut 133 screw threaded on the outer end of the screw while the pin 131 is adapted to contact with the upper face of the arm 130 and, for this purpose, is mounted for longitudinal movement in a vertically disposed bore 134 which extends from the slot 128' to the upper end of the plunger in vertical alignment with the screw 132.

The pin 13 is yieldingly maintained in contact with the end of the arm 130 by means of a compression spring 135 positioned in the bore 134 between the pin 131 and a screw 136 screw threaded in the upper end of the bore 134, said spring being of sufficient tension to support the weight of the plunger and the bottle B to be capped and thereby maintain the arm in contact with the screw 132 under normal pressure and, at the same time, provide a yielding connection between the arm and the plunger so that the bottle B may be brought, by the action of the arm, to the capping position without damage to the bottle.

The plunger 128 may be adjusted relative to the arm and bed plate 2 by the manipulation of the screw 132 to bring the upper end surface of the plunger in the plane of the upper surface of the bed plate 2 to smoothly receive the bottle from the bed plate as said bottle is being positioned on the plunger by the action of the bottle carrier 54 in a manner hereinbefore explained.

The plunger 128 is also provided with suitable longitudinally disposed slots or recesses 137, 138 and 139 formed in the peripheral wall thereof in vertical alignment respectively with the bottle-supporting arms 88 on the bottle carrier 54 and the bottle positioning plate 103 on the arm 89 to permit the plunger to freely move past said arms and plate during the longitudinal movement thereof.

The arm 130 is rotatably mounted intermediate its ends upon one end of a stud 140 secured to the frame 1 near the rear end thereof in a plane below the bed plate 2. The other or rear end of the rock arm 130 is provided with a roller stud 141 engaging in the cam groove 142' of the cam wheel 142 secured in any suitable manner as by a key 143 and set screw 144 to the cam shaft 8 intermediate the cam member 98 and one of the beveled gears 119, Figure 4, so that upon each revolution of the cam shaft 8 and cam wheel 142, a vertical reciprocative movement will be imparted by the arm 130 to the plunger 128 to bring the bottle resting on the plunger to and from the capping position.

Bottle capping mechanism

The bottle-capping mechanism, in this instance, consists primarily of a cap blank feeding apparatus adapted to automatically feed one cap forming disc at a time over the mouth of a bottle, a cap-forming mechanism adapted to form the disc into a skirted cap over the mouth of the bottle and, at the same time, to pleat the skirt of the cap, a mechanism for folding the pleats about the neck of the bottle and a stapling means for securing the skirted cap in position on said bottle, all of which are mounted in co-operative relation with each other and with the bottle plunger 128 upon a vertically disposed supporting shaft 145 (see Figures 3, 15 and 20).

The shaft 145 is mounted for longitudinal vertical movement in the frame 1 for the purpose of varying the relative position of the capping mechanism and the bottle-supporting plunger 128 for permitting the capping of bottles of different heights.

The supporting shaft 145, in this instance, is slidably mounted in the bore of a downwardly extending tubular projection 146 made integral with the bed plate 2 and located at the rear and to one side of the axis of the bottle carrier 54. The supporting shaft 145 is splined by a key 146' secured to the shaft and registering in a longitudinal key way provided in the bore of the projection 146 to prevent rotation of the shaft while the shaft is adjustably maintained in a predetermined fixed position by means of a lift collar 147 mounted on the reduced lower end 145' of the shaft 145 with the upper face of the collar in contact with the shoulder formed by said reduced portion (see Figures 3, 8 and 20).

The collar 147 is provided with a lateral portion 147' having a vertical bore therethrough adapted to receive an adjusting screw 148 which has its upper and lower ends rotatably mounted in suitable apertures provided in the extension 146 and adjacent tie member 3' of the frame 1 respectively.

The screw 148 is held against axial movement by a collar 149 secured to the lower end of the screw in contact with the lower surface of the cross member 3' while a hand wheel 150 for rotating said screw is secured to the screw with the hub thereof contacting with the upper surface of said cross member so that the supporting shaft 145 and, therefore, the capping mechanism carried thereby may be elevated or lowered at will by the proper manipulation of the hand wheel 150 and screw 148 and then secured in the adjusted position against axial movement by means of a pair of clamping sleeves 151 and 152, said sleeves being slidably mounted in a bore provided in a horizontal boss 153 extending inwardly from the adjacent side of the frame 1 and tangentially to the extension 146 for the supporting shaft 145 (see Figure 15), said bore being disposed tangentially to and partially intercepting the bore in said extension so that by positioning the sleeves 151 and 152 in spaced relation at opposite sides of the shaft 145, the opposed ends of the sleeves may be brought into clamping engagement with the shaft 145 by means of a locking screw 154.

Said locking screw 154 is rotatably mounted in the outer positioned sleeve 151 with the inner end of the screw provided with threads and having threaded engagement with the inner positioned sleeve 152. The screw 154 is also provided with a head 154' of larger diameter than the screw and adapted to engage the outer end of the sleeve 151 so that by the manipulation of the screw 154, the sleeves 151 and 152 may be moved to and from each other into and out of gripping engagement with the shaft 145.

The supporting shaft 145 extends a considerable distance above the bed plate 2, and in this instance, has the upper portion thereof provided with a bearing portion 145" slightly reduced in diameter and a still further reduced portion 145''' provided at the upper end thereof.

Upon the upper reduced end 145''' of the shaft 145 is rigidly mounted a capping head member 155 having a plurality of, in this instance three, radial arms 155" for supporting the cap-forming and stapling mechanism. A lever supporting ring 156 is also supported by the end 145''' and is positioned in spaced relation over said head member and connected therewith by a vertically disposed spacing stud 157 positioned diametrically opposite the supporting shaft 145, said stud being screw threaded in the head 155 and having its upper reduced end 157' extending through a suitable aperture in the ring 156 and clamped thereto by a nut 158 screw threaded on the upper end of the stud.

Both the head and ring are provided with respective apertured hubs 155' and 156' positioned at one side thereof and mounted on the upper end of the shaft 145 one above the other and secured thereto against relative rotary motion by a key 159 positioned in registering slots formed in the end 145'''' and bores of the respective hubs 155' and 156'.

Cap blank feed mechanism

The caps as A, Figure 44, formed over the mouth of the bottles, are preferably made of circular discs as a, Figure 43, stacked one upon the other in a suitable magazine 160, Figures 32 and 38, and adapted to be fed from the bottom forwardly one at a time, to a position intermediate the mouth of a bottle B, Figure 3, to be capped and the cap-forming mechanism mounted on the head 155.

The magazine 160 is a tubular member open at both ends and supported at one side of the head 155 by a bracket 161 secured to or made integral with the head 155, said bracket being split radially at one side thereof and secured together in clamping engagement with the magazine 160 intermediate the ends of said magazine by a clamping screw 162.

The magazine 160 is so positioned in the bracket 161 that the lower end thereof is maintained in juxtaposition to the upper surface of a disc-feeding plate 163 adapted to feed the cap blanks over the head of the bottle B. The feeding plate 163, in this instance, is substantially flat in cross section with a width slightly greater than the diameter of the magazine 160 and formed concentric with the capping mechanism supporting shaft 145.

The plate 163 is constructed with a radial arm 163' which extends from the inner edge thereof and terminates in a vertically disposed tubular boss or hub 163'' which is rotatably mounted upon the portion 145'' of the supporting shaft 145 between the head hub 155' and a thrust washer 164.

The thrust washer 164 is adjustably maintained in contact with the lower end of the hub 163' by a nut 165 screw threaded on the upper end of the major portion of the shaft 145, the nut being secured against rotation in the adjusted position by a set screw 166 screw threaded in the side of the nut 165. This construction not only permits the free rotation of the feed plate 163 upon the shaft 145, but causes said plate to be moved axially with the shaft 145 in fixed relation with the head 155 during the axial adjustment of the shaft to bring the feed plate in a horizontal plane just above the head of the bottle B when the bottle-supporting plunger 128 is in the extreme down position.

The feed plate 163 is also supported at its peripheral edge by an arm 167 secured at one end to the outer edge of the bracket 161 by screws 168 or their equivalent. The arm 167 extends downwardly from the bracket and has its lower end turned inwardly in a horizontal plane beneath said feed plate in contact with the under-surface thereof. The feed plate 163 is of sufficient length circumferentially to remain in registration with the magazine 160 during the feeding movement of said plate for preventing the displacement of the paper discs contained in the magazine. The forward end of the plate is provided with an inwardly extending semi-circular opening 170 adapted, when the plate is in the forward position to be in vertical alignment with the bottle B to be capped (see Figure 32).

The opening 170 is of greater width than the diameter of the head of the bottle to permit the free movement of the bottle therethrough. The forward end of the plate and opening 170 is also adapted, when in the rear position, to be in registration with the lower end of the magazine for receiving the lowermost cap blank from the magazine and for this purpose, the upper surface of the forward end of the plate is provided with a relatively shallow semi-circular recess 171 concentric with the opening 170 and of about the thickness and diameter of one of the paper discs a for receiving the discs therein which are automatically fed downwardly by any suitable means such as a weight 172 resting upon the uppermost disc.

The recess 171 is also connected with the front end of the feed plate 163 by means of a recess as 171' formed with parallel opposed sides spaced apart a distance equal to the diameter of the recess 171. The feed plate 163 is oscillated horizontally to bring the opening 170 from registration with the magazine into and out of alignment with the bottle to be capped, and a cap-forming mechanism presently described and vice versa by a cam member 172 keyed or otherwise secured to the upper end of the cam shaft 8, Figures 4 and 32.

The cam 172 is operatively connected to the feed plate by a horizontally disposed rock arm 173 pivotally mounted intermediate its ends upon a vertically-disposed stud 174 which extends downwardly through and is supported by an upwardly extending lug 175 formed on the upper cam shaft bracket 10, the lower end of said stud being screw threaded into the adjacent portion of the plate 2 and maintained against displacement by a cap screw 176 screw threaded in one side of the lug 175 (see Figure 4).

The rear end of the arm 173 is provided with an upwardly extending stud 177 upon which is rotatably mounted a roller 178 adapted to travel in a cam groove 172' provided in the under-surface of the cam member 172. The other or forward end of the arm 173 is provided with a gear segment 179 having meshing engagement with teeth 180 formed longitudinally upon the face of the feed plate hub 163'' so that any rocking movement of the arm 173 produced by the cam 172 will impart a corresponding oscillating movement of the feed plate 163 through the medium of the gear segment 179 and teeth 180.

By referring to Figure 3, it is evident that the plate 163 may be moved axially by the shaft 145, within the limits desired, due to the teeth of the segment gear 179 always being in mesh with the relatively long gear teeth 180 without the necessity of varying the vertical position of the arm 173 or cam member 172. As the feed plate 163 is moved forwardly from the rear position, the cap disc contained in the recess 171 will be automatically moved rearwardly into peripheral engagement with the rear vertical wall of the recess by a substantially vertically disposed finger 181 carried by the bracket 161 for positioning the disc concentric with the recess 171 and, therefore, in vertical alignment with the bottle B to be capped.

The finger 181 is positioned at the forward outer face of the magazine 160 with the upper end thereof pivotally connected at 181' to one end of a forked stud 182 which is screw threaded in the adjacent under face of the magazine supporting bracket 161, Figure 39. The lower end of the finger is formed in a downwardly projecting relatively narrow portion normally positioned in a relatively shallow groove 183 made concentric with the shaft 145 in vertical alignment with the center of the magazine 160 and which extends from the recess 171 to the rear end of the feed plate 163.

The lower end of the finger 181 is free to swing forwardly above the pivot 181' during the forward movement of the feed plate when it is engaged by the cap blank contained in the recess 171 to permit the free passing of the disc and which also, as previously stated, positions the disc concentrically with said recess.

The finger 181 is prevented from moving rearwardly from the normal position by the rear portion of the upper end of the finger contacting with the stud 182 which maintains the lower end of the finger in the groove 183 during the rearward movement of the feed plate and, therefore, in the path of movement of any cap blank which may remain in the recess during such rearward movement due to the failure of operation of any portion of the mechanism or the non-presence of a bottle to remove the disc or for any other reason.

This positioning of the finger in the groove will cause the removal of any disc from the recess and feed plate during the rearward movement of the plate, thus leaving the recess empty and ready to receive the next lowermost disc without danger of clogging or interfering with the free operation of the machine.

Cap-forming and pleating apparatus

Associated with the bottle-supporting plunger 128 and the bottle carrier 54 is a pleat-forming plate or die 185, (Figure 41), secured by screws 186, or equivalent fastening means, to the lower face of the supporting head 155 in a horizontal plane a relatively short distance above the disc-feeding plate 163, (Figure 3).

The pleat-forming plate 185 is provided with a central opening 185' of slightly greater diameter than the end of the bottle to be capped and arranged in registration with an upwardly extending bore 155''' of substantially the same diameter provided in the lower face of the head 155. The opening 185' and bore 155''' are arranged in vertical alignment with the bottle-supporting plunger 128 and, therefore, with the bottle B positioned on said plunger by the carrier 54 in a manner hereinbefore explained, for the purpose of receiving the head of the bottle, as said bottle is being elevated by the action of the plunger.

It is now evident that when the lowermost disc is fed forwardly by the feeding plate 163 from the magazine 160 over the head of the bottle B, the raising of the bottle-supporting plunger 128 will force the head of the bottle first through the opening 170 in the feed plate and against the overlying disc a and thence upwardly carrying the disc through the opening 185' in the plate 185 and into the bore 155''' of the head 155 for applying the cap to the mouth of the bottle and pleating and folding the skirt of the cap around the neck of the bottle, in a manner presently described. During this upward movement of the bottle, the portion of the cap overlying the mouth of the bottle will be pressed into engagement with an aligned platen 188 secured to the lower end of an upright plunger 189 (Figures 3 and 22). This plunger 189 is guided in a vertical opening 190' provided in the head 155 and which extends from the bore 155''' through an upwardly projecting post 190 secured to or made integral with the head 155.

The plunger 189 is hollow, with the bottom closed by the platen 188 and is spring pressed downwardly by a coil spring 191 positioned in the plunger between the platen 188 and a pressure pin 192 which is slidably mounted in the upper end of the plunger 191, with the upper end thereof normally extending above the plunger in contact with the forward end of a bell crank lever 193 which limits the upward movement of the pin.

The upper end of the plunger 189 is provided with a pair of lock nuts 194 screw-threaded thereon and normally positioned in the enlarged upper end of the opening 190' for limiting the downward movement of the plunger and positioning the platen 188 just above the plane of travel of the incoming cap disc a, ready to engage the disc substantially as soon as the disc is picked up by the bottle, to maintain said disc in position over the mouth of the bottle during the upward movement thereof against the platen as it passes through the opening 185' in the platen-forming plate 185.

A plurality of, in this instance, five pendant guide fingers 195 are screw-threaded or otherwise secured to the underface of the pleating plate 185 and arranged in spaced relation circumferentially at convenient places about the opening 185' and extend downwardly to the vicinity of the horizontal plane of travel of the feed plate 163. The inner edges of each of the fingers 195 are tapered inwardly and upwardly and spaced from the vertical plane passing through the center of the plate opening 185' a distance substantially equal to the radius of the cap blank a for guiding the blank in its passage from the feed plate to the pleating plate.

The upward movement of the bottle and disc through the plate 185 is for the purpose of deflecting the skirt of the cap downwardly and for pleating the skirt so that the lower portion thereof may be impinged tightly against the neck of the bottle. For this purpose, the lower face of the plate 185 adjacent the wall of the opening 185' is beveled upwardly and inwardly to reduce the resistance of the upward movement of the bottle and the cap thereon, and at the same time, to assist in deflecting the skirt of the cap downwardly around the head and neck of the bottle.

The pleating of the skirt of the cap is accomplished by providing the pleat-forming plate 185 with a plurality of, in this instance, six substantially radial slots 196 extending outwardly from the center opening 185' and preferably arranged in pairs in equal spaced relation circumferentially around the opening (see Figures 24, 41 and 42).

The upper adjacent edges of each pair of slots 196 are beveled at 196' to facilitate lateral deflection of the pleats a'. It will now be clear that as the bottle with the cap blank maintained thereon by the platen 188, continues its upward movement against the action of the spring 191, the central portion of the blank will be held flatwise against the head of the bottle, while the skirt of the cap blank will be deflected downwardly by the inclined lower face of the plate and the portion of the skirt registering with the slots 196 will be drawn through the slots to form the pleats a' (see Figure 42).

The upward movement of the bottle is continued until the pleats are finished, to the lower edge of the skirt at which time the pleats will extend substantially radially outwardly about the neck of the bottle B, with the wider portion of the pleats at the lower end thereof. The pleats a' are also arranged in a plurality of, in this instance, three pairs positioned in uniformly spaced relation circumferentially and in condition to permit the application of a folding device thereto for folding the pleats against the intervening portion of the skirt and around the neck of the bottle preparatory to stapling the pleats and skirt together.

*Pleat-folding mechanism*

The capping head 155 is provided in its lower surface with a plurality of, in this instance, three radial guide grooves 197 having radially disposed channels 197' extending longitudinally of the side walls of the groove intermediate the upper and lower edges thereof, said grooves 197 being arranged in uniformly spaced relation circumferentially and in a vertical plane extending radially substantially midway between adjacent pairs of pleating grooves 196 as shown more clearly in Figures 23, 24 and 26.

Slidably mounted upon the pleating plate 185 and in each guide groove 197 is a pleat-folding slide member 198 which extends outwardly beyond the adjacent portion of the head 155 and has the inner end thereof provided with an inwardly extending transversely disposed slot 198' adapted to register with the channels 197' for receiving a pleat-folding plate 199. These plates 199 are somewhat wider than the slide members 198 and project laterally therefrom into respective channels 197' and are pivotally connected to the slide by a downwardly projecting pin 200 provided in the inner end of each slide 198 so as to be moved by the slide to and from the periphery of the neck of the bottle which has been positioned by the vertical movement of the plunger 128 so that the lower portion of the pleats a' of the skirt is in the horizontal plane of movement of the folding plates 199.

The upper inner surfaces of the plates 199 adjacent the vertical sides thereof are recessed as at 199' to permit the free operation of respective stapling heads, presently described, while the inner edge of the plates are concaved to conform to the contour of the neck of the bottle so that as the plates are moved inwardly, they will engage adjacent pleats a' of respective pairs to effect the folding of each pair of pleats towards each other circumferentially against the portion of the skirt and neck of the bottle between the several pairs of pleats (see Figure 26). If, however, the lower portions of the pleats are of such a length radially as to overlap when in the folded position, it is necessary to fold one pleat of a pair in advance of the other pleat and, for this purpose, a spring as 201 is provided in a recess 202 positioned in the inner end of the slides 198 at one side of a vertical plane passing radially through the plate-supporting pins 200 so as to yieldingly maintain the corresponding side of the plate 199 in advance of the other side of the plate which will cause the pleat actuated by that side to fold in advance of, and in the opposite direction to the pleat folded by the other or retarded side of the plate and thereby fold the pleats of each pair in overlapping relation.

Each of the slide members 198 and the corresponding folding plates 199 are maintained in their outer inoperative position by respective levers 203 against the action of respective coil springs 204 positioned in grooves 205 which extend longitudinally across the bottom faces of the slides and between the lower ends of the folding plate-supporting pins 200 and the inner ends of spring stop members 206, also positioned in said grooves 205, and secured by a pin 207 or other suitable means to the pleating plate 185.

The operating levers 203 are arranged substantially vertically over the respective slides 198 with their lower ends positioned in respective slots 208 provided in the upper surface of each slide 198 near the outer ends thereof, while the upper ends of the levers are positioned between respective pairs of spaced lugs 209 formed on the periphery of the lever-supporting ring 156 and pivotally connected thereto by pins 210. The levers 203 are also positioned in and extend through elongated slots 211 provided in substantially radially disposed horizontal arms 212 secured at their inner ends in uniformly spaced relation circumferentially, to a sleeve member 213 which is slidably mounted for vertical reciprocating movement upon the post 19 connected with the head 155.

The sleeves are maintained in their normal vertical or outermost positions by respective rollers 214 positioned in the slots 211 near the inner ends thereof in contact with the inner vertical edges of the levers 203 and rotatably mounted on respective pins 215 which have their ends secured in the arms at opposite sides of the respective slots 211.

The upper portion of the inner vertical walls of the levers 203 terminates in a cam portion 203' which is inclined outwardly and upwardly and positioned below the ring member 156 so that when the sleeve 213 is moved to the extreme up position, as indicated by dotted lines in Figure 22, the rollers 214 will be positioned about the cam surface 203' out of contact with the respective levers 203 which permits the levers to be rocked inwardly about their respective pivots 210 by the action of the spring 204 upon the respective slides 198 which also causes the folding plates 199 to be moved to the pleat-folding position in the manner previously described.

The plates 199 and slides 198 remain in the innermost or pleat-folding position to maintain the pleats in the folded position until after said pleats are secured together and to the intervening portion of the skirt by staples, in a manner presently described, after which the plates and slides are simultaneously returned to the normal outermost position against the action of the respective springs 204 by the outward pivotal movements of the levers 203 caused by the downward movement of the collar 213 which first brings the rollers 214 in contact with the respective cam surfaces 203' which quickly rocks the levers outwardly and then maintains said levers in their outer positions during the remainder of the downward stroke of the sleeve by the rollers contacting with the substantially vertical portions of the inner edges of said levers.

The reciprocating movement of the sleeve 213 is produced by the bell crank lever 193 which has the forward end thereof positioned between and pivotally connected by a pair of pins 216 to the upper ends of a pair of downwardly extending links 217 which are pivotally mounted at their lower ends to respective shouldered studs 218 screw threaded or otherwise secured in diametrically opposite sides of the sleeve member 213 as clearly illustrated in Fig. 22.

The bell crank lever 193 is postioned between and pivotally connected by a pin 220 to a pair of spaced arms 221 formed integral with the hub 156' of the lever-supporting ring 156 and which extend upwardly and rearwardly therefrom. The rearwardly positioned arm as 193' of the bell crank lever 193 extends downwardly from the pivotal pin 220 and has a stud 222 secured to and projecting from the lower end thereof.

Rotatably mounted on the stud 222 at one side of the arm 193' is a substantially rectangular guide block 223 which is also slidably mounted in a vertically disposed groove 224 provided in a cross head 225 which, in this instance, is mounted for longitudinal reciprocative movement in a suitable vertically disposed bracket 226 secured by screws 227 or their equivalent, to the upper surface of the bed plate 2 at the rear of the supporting shaft 145 and substantially diametrically opposite the capping head 155.

The groove 224 is positioned at the forward end of the cross head 225 and is of sufficient length to maintain the guide block 223 in operative engagement therewith during any vertical movements of the supporting shaft 145 and the bell crank lever 193 carried therewith necessary for the proper positioning of the head 155 for capping bottles of different heights.

The cross head 225 is reciprocated horizontally by a rock arm 228, (Figures 1, 4 and 37), which is pivotally mounted intermediate its ends on the upper end of the stud 174 upon which the feed plate actuating arm 173 is pivoted and adapted to rock in a horizontal plane above said feed plate actuating arm, to impart a reciprocating motion to the cross head 225 and, for this purpose, the cross head is provided with a slot 225' elongated horizontally and positioned intermediate the groove 224 and the opposite or rear end of the cross head for receiving one end of the arm 228 therein, the end of said arm being positioned in the slot 225' between opposed ends of a pair of plungers 229 and 230 which are slidably mounted in a bore 225'' extending centrally of the cross head from the forward end thereof inwardly.

The rearwardly positioned plunger 229 is adjustably maintained in a predetermined fixed position by an adjusting screw 231 which is screw-threaded in the rear end of the cross head to extend into the bore 225'', said screw 231 being maintained in the adjusted position by a lock nut 232 screw-threaded on the screw and positioned adjacent the rear face of the cross head.

The end of the arm 228 is yieldingly maintained in contact with the inner end of the rearwardly positioned plunger 229 by the forwardly positioned plunger 230 and a compression spring 233 positioned in the forward end of the bore 225'' and coiled about the reduced forward end 230' of the plunger 230 and between the shoulder formed on the plunger by the reduced portion, and a pin 234 secured to the forward end of the cross head and which extends diametrically through the bore 225''.

It is evident that this construction not only provides a yielding operative connection between the arm 228 and the cross head 225 for moving the cross head in one direction which is to cause the upward movement of the forwardly positioned arm as 193'' of the bell crank lever 193 and the consequent lifting of the lever-actuating sleeve 213, but also provides a means whereby the cross head may be adjusted relatively to the operating arm 228 by the manipulation of the adjusting screw 231 which, in turn, varies the position of the forward end of the bell crank lever 193 vertically and consequently of the sleeve 213 connected with the bell crank lever, for the purpose of positioning the lever actuating rollers 214 carried by the sleeve into proper relation with the cam faces 203' of the respective levers 203 when said sleeve is in the uppermost position, as hereinbefore explained.

The rock arm 228 is actuated by means of a cam wheel 235 secured to the upper end of the cam shaft 8 through the medium of the cam member 172 with which the cam 235 is secured by means of a pin 236 (see Figure 4), said arm 228 having its rearwardly extending end provided with a roller stud 237 engaging in a cam groove 235' of the said cam 235, so that during each revolution of the cam shaft 8 and cam 235, will produce a corresponding longitudinal movement of the cross head 225 through the action of the rock arm 228.

This movement of the cross head will produce a corresponding rocking movement of the bell crank lever 193 which, in turn, produces first, an upward movement of the sleeve 213 to release the levers 203 and permit the slides 198 and the pleat-folding plates 199 connected therewith to be moved inwardly by the action of the respective spring 204 to produce the fold of the pleats $a'$ at which position the plates will temporarily remain due to the particular shape of the cam 235 for the purpose of permitting the folded pleats of the cap to be stapled by a suitable mechanism, presently described, after which the folding plates and slides are returned to the normal inoperative position by the downward movement of the sleeve in the manner previously described.

Stapling mechanism

There is preferably provided a plurality of, in this instance, three stapling devices, one for each pair of bottle cap pleats, as more clearly shown in Figures 24 and 26. Each stapling device is mounted in respective guide slots 238, one slot being provided in the undersurface of each radial arm 155'' of the capping head 155 in close proximity to the folding plate 185 and arranged in uniformly spaced relation circumferentially about the opening 155' in the head 155 and in radial alignment with a respective pair of the previously folded pleats, and therefore, radial to the neck of the bottle B.

The stapling devices are constructed substantially alike and each one comprises a rectangular body member 240, slidably mounted for longitudinal movement radially to and from the neck of the bottle in respective radially disposed slots 238 in the head 155, the longitudinal movement of said body portions 240 being limited by a stop bar 241 positioned transversely of the arms 155'' in an elongated slot 242 provided in the lower face of the body 240, near the outer end thereof, said bar 241 being also positioned in a suitable transverse slot as 241' provided in the lower face of the body 155 which holds said bar against lateral displacement while the bar is retained in said slots 241' by a cotter pin 242' or its equivalent, which secures the bar to the adjacent portion of the pleat-forming plate 185.

The body 240 of each stapling device is also provided with a vertically disposed recess 243 at the outer end thereof and which extends from the upper surface of the body downwardly to within a relatively short distance of the stop bar slot 242.

The forward or inner end of the body 240 is constructed with a vertically disposed T slot 244, which extends from the top to the bottom of the body, while a relatively narrow guide groove 245 is arranged longitudinally and in the upper face of the body 240 between the T slot 244 and the recess 243.

In each vertical wall of the body and near the bottom thereof, is provided a longitudinal groove 246 disposed in substantially the horizontal plane of the pleat-folding plates 199 for receiving respective staple cut-off and forming bars 247 (see Figures 24, 30 and 31). The bars 247 are slidably maintained in the respective grooves 246 by the adjacent side wall of the corresponding stapling body-receiving guide slots 238 provided in the head 155.

The stapling bars 247 are preferably composed of steel or its equivalent, with the forward end thereof tempered and formed in a plane at substantially right angles to the longitudinal side walls thereof which provides a comparatively sharp cutting edge for the purpose of cutting the wire for forming the staple, as hereinafter more fully explained. The inner face of the forward end of each bar is also provided with an inwardly extending groove 247' of substantially the same diameter as the wire W for forming the staple. When the bars are in the normal inactive or outermost position it will be noted that the inner ends of said bars are positioned a relatively short distance outwardly from the vertical plane of the T slot 244 provided in the inner end of the body 240 for permitting the ready entrance of the wire ahead of the bars. The outer ends of the bars extend beyond the outer end of the respective body 240 and are positioned in respective horizontally disposed slots 248 formed in the vertical side walls of a staple forming head 249.

The bars 247 are adjustably secured to the head 249 and for this purpose, the outer vertical edges of the outer ends thereof are provided with a series of vertically extending serrations adapted to be engaged by corresponding serrations formed in the inner face of respective clamping strips 250 positioned in corresponding vertical slots 249' formed in the outer vertical side faces of the head 249 and secured to said head in any suitable manner as by screws 251 (see Figures 22, 24 and and 26).

The stapling bar head members 249 are each mounted for longitudinal reciprocating movement upon respective horizontally disposed guide rods 252 secured to and extending outwardly from the outer ends of respective stapling body members 240. The guide rods 252 extend outwardly some distance beyond the respective head members 249 for receiving and supporting thereon a tension spring 253 adapted to constantly urge the respective head 249 and the bars 247 connected therewith inwardly, said springs being coiled about the rods 252 and positioned between the respective head 249 and a flanged washer 254 adjustably supported on the outer ends of the rods by respective wing nuts 255 screw threaded on the ends of the rods.

Each of the heads 249 and the respective forming bars 247 connected therewith are maintained in their normal outermost position against the action of the spring 253 by an L-shaped slide 255 mounted for longitudinal reciprocal movement in the guide groove 238 over the upper face of the body 240.

The outer end of the slide 256 is provided with a vertically disposed downwardly extending leg 256' having a centrally located upwardly extending slot or opening 256" in the lower end thereof for receiving therethrough a staple drive plunger 257 presently described, said leg being disposed at the inner or forward end of the stapling bar head 249 and adapted to travel in the recess 243 of the body 240 (Figures 25 and 26).

The upper face of the slide 256 is provided with a series of transversely disposed rack teeth 258 adapted to have meshing engagement with a segmental gear 259 formed on the lower peripheral edge of a substantially vertically disposed rock arm 260 which extends upwardly from the slide 256 through an elongated slot 261 formed in the stapling head 155 over each guide groove 245 of the stapling body 240. The upper end of each of the arms 260 are positioned respectively between a pair of spaced radial lugs 262 provided on the peripheral face of the lever-supporting ring 156 and pivotally connected therewith by respective pins 263 positioned in registering openings provided in the lugs and upper end of the respective arms 260 (see Figures 22 and 25).

These staple head actuating arms 260 are each operably connected with the lever-operating sleeve 213 by means of respective bifurcated links 264 which are pivotally connected at their outer ends with the arms 260 by respective pins 265 and have their inner ends positioned in respective radial slots 213' provided in the lower end of the sleeve and pivotally connected therewith by respective pins 266 positioned in registering openings in the links and adjacent portion of the sleeve 213. These links 264 are arranged to extend outwardly from the sleeve in substantially a horizontal plane when the sleeve is in the lowermost position, as clearly illustrated in Figures 22 and 25, therefore, maintain the respective arms 260 and slide 256 actuated thereby in the outermost position, and when the sleeve is moved to the extreme upper position by the action of the bell crank lever 193 in the manner hereinbefore described, the arms 260 will be rocked inwardly about the respective pivotal pins 263 by the links 264, as illustrated by dotted lines in Figures 22 and 25.

This inward swinging movement of the arms 260 will, of course produce a corresponding longitudinal movement of the respective slides 256, due to the meshing engagement of the gear segment 259 and rack teeth 258.

In the lower portion of the T slot 244 provided in the forward end of the body 240 is positioned a staple guide support or head 267 which is secured therein by a screw 268, Figure 25.

The upper end of the head 267 terminates in the horizontal plane of the staple cut-off and bending bar grooves 246, that is, with the upper end surface of the head 267 substantially flush with the bottom of a relatively shallow guide slot 269 disposed in a horizontal plane just above the path of movement of the pleat-forming plates 199 previously described. Said slots 269 extend longitudinally of the respective body 240 from the inner or forward end thereof towards the outer end of the body and transversely of the body from one staple-forming bar groove 246 to the other. Slidably mounted in the guide slot 269 is a staple-driving slide 270 which has a transverse V-shaped slot 270' provided in the forward end thereof, which is of less depth than the diameter of the wire W from which the staple is formed, for the purpose of receiving and holding the wire during the forming of the staple in a manner presently described.

To the slide 270 is connected the hereinbefore mentioned stapling drive plunger 257 which is arranged in a longitudinal bore 271 extending from the recess 243 forwardly in a horizontal plane over the slide 270, the plunger 257 being provided with a vertically disposed stud 272 screw-threaded in the forward end thereof.

The stud 272 is formed with a reduced end adapted to project downwardly below the plunger 257 into registration with a suitable opening provided in the slide 270 near the outer end thereof. The plunger 257 is formed with a reduced portion 257' which extends rearwardly from near the forward end of the plunger through the slot 256" formed in the leg 256' of the slide 256 and into a suitable opening 249" provided in the staple forming bar head 249.

The reduced portion 257' of the plunger 257 is of less diameter than the bore 271 and of greater diameter than the width of the slot 256" in the slide 256 and to permit the free relative movements of the plunger and slide, the vertical sides of the reduced portion 257' is flattened from near the outer end of the plunger inwardly thereby forming a shoulder 257" near the outer end of the plunger, adapted to be engaged by the outer face of the leg 256' and which is normally maintained in contact with said leg by a coil spring 273 coiled about the reduced portion of the plunger between the shoulder of the plunger formed by said reduced portion and the inner face of the leg 256'.

In the upper portion of the T slot 244 is mounted for vertical movement a flat plate 274 of substantially the same width as the staple-driving slide 270 and which is for the purpose of cooperating with said slide for holding the wire W during the forming of the staple.

The wire-holding plate 274 when in the lowermost or operative position, rests upon and extends from the upper face of the head 267 to within a relatively short distance of the top of the body 240. In other words, when the wire-holding plate 274 is in the lowermost position, the lower end thereof will be in the path of movement of the staple driving slide 270 and the upper end of the plate will be in registration with the forward end of the guide groove 245 provided in the upper face of the body 240.

The plate 274 is moved vertically to and from its lowermost or operative position by means of a trip lever 275 which is positioned in the groove 245 and pivotally connected with the body 240 by means of a pin 276 extending through an opening intermediate the ends of the trip lever and secured in the side walls of the groove 245. The forward end of the lever 275 is slightly reduced and positioned within a suitable opening 274' provided in the plate 274 near the upper end thereof.

The other end of the trip lever 275, when the plate 274 is in the lowermost position, is adapted to extend upwardly beyond the upper face of the body 240 into a groove 278 provided in the under face of the slide 256 in registration with the groove 245 in the body 240.

The rear end of the trip lever 275 is yieldingly maintained in registration with the groove 278 when the slide 256 is in the outer position, by means of a compression spring 279 which has one end thereof positioned in a suitable opening provided in the lower face of the trip lever 275 and the other end resting against the lower wall of the groove 245. The inner end of the groove 278 is positioned outwardly a short distance beyond the end of the trip lever 275 when the slide 256 is in its outermost position, as illustrated in full lines, Figure 25, and is curved downwardly to form a cam face adapted to engage the rear or outer end of the trip lever 275, normally positioned in the groove 278 for rocking the outer or rear end of the lever 275 downwardly against the action of the spring 279 and thereby raising the forward or inner end of the trip lever and the plate 274 connected therewith, sufficiently to bring the lower end of the plate above the guide slot 269 and out of the path of movement of the staple-driving slide 270 for the purpose presently more fully described.

The upper end of the staple guide support or head 267 is provided with a pair of lateral slotted arms 267' projecting from opposite vertical sides thereof, and each having pivotally connected therewith a staple guide dog 280 which is positioned in said slots and rotatably mounted on respective pins 281 which are positioned in registering openings provided in the arms 267' and respective dogs 280.

The inner opposed ends of the dogs, when in their normal operative position, are tapered rearwardly and outwardly from each other and are provided with respective grooves 280' arranged in the horizontal plane of the travel of the staple-driving slide 270 with the outer or rear faces of the groove spaced apart a greater distance than the width of the slide 270, while the forward or inner ends of the grooves are spaced apart a distance which is less than the width of the slide 270 so that as the formed staple is carried forward by the action of the slide 270 in a manner hereinafter more fully described, the forward ends of the arms of the staple will impinge against the wall of the grooves 280' and be deflected towards each other as they are driven through the folded pleats a' and against the adjacent peripheral face of the neck of the bottle B.

It is now evident that each of the stapling mechanisms consisting primarily of the body member 240, the slide member 256, staple guide and supporting head 267 and the staple cut-off forming bars, together with the head member 249 constitute a separate unit which may be readily and easily removed for the purpose of repairing or replacing any of the parts thereof from the respective guide slots 238 formed in the head 155 by first disengaging the respective arms 260 from the slide 256 by removing the pivotal pins 263.

The stop bar 241 may then be removed from the slot 241' by first removing the cotter key 242' and then by partially withdrawing the wire guide members 283, after having loosened the respective clamping bolts 284. The stapling units are then free to be withdrawn from the respective guide slots 238 and, for this purpose, the vertical side walls of each of the stapling body receiving guide slots 238 are provided with a longitudinal lateral groove 285 of slightly greater width than the thickness of the arms 267' of the heads 267 and arranged in the horizontal plane of the travel of said arms for permitting the free movement of the head 267 and the respective arms through the guide slot 238, during the removal or replacement of the stapling unit.

The wire guide members 283 consist, in this instance, of a tubular member 283' positioned in one side of each head arm 155'' of the head 155 in the horizontal plane of the staple driving slide 270. A second tubular member as 283'', composed of hardened steel or its equivalent, is securely driven into the outer tubular member 283' and when positioned in the head 155, the inner end of the tubular member 283'' is arranged in the plane of movement of the outer edge of the respective cut-off and bending bar 247 to co-operate with the forward end thereof in severing the staple portion of the wire from the remaining portion thereof, and the guide member 283 is maintained in operative relation with the respective cut-off bars 247 by means of the clamping bolts 284 as shown more clearly in Figures 24 and 26.

The wire guide members 283 are positioned relative to the respective stapling body 240, so as to feed the wire transversely of the body 240 between the wire-holding plate 274 and the forward end of the staple-driving slide 270, as more clearly illustrated in Figure 30.

The wire W, of course, is intermittently fed a predetermined amount into the stapling mechanism by a mechanism hereinafter described, in readiness to be formed into a suitable staple, and then carried forward through the adjacent folded pleats a' upon said pleats reaching the folded position. This operation is performed in the following manner:

As the sleeve 213 is moved upwardly along the post 190 by the action of the bell crank lever 193 and, for the purpose of folding said pleats a' in a manner hereinbefore explained, the respective rock arms 260 will be rocked inwardly about their pivots 263 by the action of the links 264, which will cause the slides 256 to be carried forward against the action of the plunger springs 273, which will cause the plungers 257 and the staple-driving plates 270 connected therewith to move forward until the portion of the wire positioned in the stapling mechanism is clamped between the forward end of the slide 270 and the wire-holding plates 274. In the meantime, the portion of the wire which is to comprise the staple will have been severed from the remaining portion thereof by the forward movement of the cut-off and bending bars 247 and the shearing coaction of the bars with the wire guide members 283'', which is caused by the action of the springs 253 upon the head members 249, causing said head members to travel forwardly with the slides 256, and thereby producing the forward movement of the cut-off bars 247 and the consequent forward movement of the severed portions of the wire until the wire reaches the respective wire-holding plates 274, at which position, it will be remembered, the wire is maintained by the coaction of the slide members 270 and wire-holding plates 274.

The continued movement of the bars 247 will now cause the outer ends of the staple-forming wire in each stapling body to be carried forward along the sides of the wire-holding plates 274 in parallel relation and in registration with the grooves 247' provided in the inner face of each of the cut-off bars 247. As the slide 256 continues the forward movement, it is evident that the spring 273 will continue to be compressed, due to the engagement of the slide 270 with the wire-holding plates 274, while the tension of the outer positioned spring 253 will continue to be released until such time as the tension of said springs is substantially equal, at which time, the body 240 and the several parts connected therewith will move forwardly in unison with the slide 256 until the outer end of the slot 242 engages the stop bar 241, whereupon the body 240 will come to rest, and as the slide 256 continues its forward movement, will move relatively to the body 240, until the outer or rear end of the groove 278 engages the rear end of the trip lever 275, which will cause the lever 275 to rock about the pin 276 against the action of the spring 279 to lift the wire-holding plate 274 above the path of movement of the staple-driving slide 270 and thereby releasing said slide and permitting it to be driven forward together with the formed staple by the action of the spring 273 until the ends of the arms of the staple engage the guide grooves 280' in the dogs 280, as illustrated by dotted lines in Figure 31.

Then, as the driving slide 270 continues its forward movement towards the neck of the bottle, the arms of the staple will be guided inwardly towards each other as they are forced through the respective plates and adjacent portion of the skirt of the cap to the neck of the bottle, and then be clinched inwardly towards each other as the end of the arms impinge against the bottle, as also illustrated by dotted lines in Figure 31. This operation, it is evident, will leave the ends of the staple in contact with the forward end of the respective grooves 280' and in order to permit the free outward or return movement of the staple guide and supporting head 267 without the removal of the staple from its holding position in the bottle cap, the dogs 280, being pivotally mounted on the respective pins 281, are free to swing about their respective axis as the head is moved outwardly until the staple is released therefrom. This outward or return movement of the staple mechanism is caused by the return or downward movement of the sleeve 213, which will cause the respective arms 260 to be returned to their normal outer position, which, in turn, causes the outward movement of the slide members 256 and the return of the bodies 240 due to the arms 256' of the slides 256 engaging the respective bar heads 249 which, in turn, acts to return the bodies 243 to the outer position with the inner end of the respective slots 242 engaging the stop bars 241 through the medium of the springs 253 and guide rods 252.

This outward movement of the slides 256 will also return the staple-driving slides 270 to their normal outermost position in spaced relation to the wire-holding plates 274 by the arms 256 engaging the shoulders 257'' formed on the plungers 257 and about the time that the driving slides 270 reaches their normal outermost position, the trip levers 275 will be brought into registration with the grooves 278 which permits the springs 279 to rock the outer or rear ends of said trip levers upwardly into registration with the respective grooves 278 and thereby return the wire-holding plates 274 to their normal down position with the lower ends thereof resting upon the upper faces of the staple guide supports 267 and in the path of movement of the corresponding driving slides 270 in position to coact with the slides 270 for receiving and forming another staple section of wire.

*Wire Feeding Mechanism*

The wires W from which the staples are formed are fed from a plurality of, in this instance, three reels, one reel for each stapling mechanism by respective staple feeding devices through their respective guides 283 and to their staple severing and bending positions in the respective stapling mechanisms.

The reels, as R, are journaled in a plane above the bell crank lever 193 on the upper horizontally disposed ends 287' of vertically disposed reel supporting rods 287 which are secured in uniformly spaced relation circumferentially to the lever-supporting ring 156, Figures 1, 2 and 3. The wire is fed intermittently and in predetermined amounts from the reels, and as it is desirable that the wire remain taut at all times, a simple and efficient brake mechanism is provided to prevent the spinning of the reels during or immediately after the intermittent feeding of the wire.

The brake in this instance, for each reel consists of a horizontally disposed rod 288 secured to the corresponding reel-supporting rod 287 adjacent the reel carried thereby and which extends outwardly in a horizontal plane from the rod 287 with the outer end portion 288' of the rod bent at substantially right angles to the remaining portion thereof and disposed transversely of and in spaced relation to the reel at the rear thereof. Upon the end portion 288' of the rod 288 is secured, in any suitable manner, one end of a flexible brake band 289 composed of leather, canvas or the like, and adapted to be passed over the top and to extend downwardly a short distance over the front face of the reel, as illustrated more clearly in Figures 16 and 17.

The front or free end of the brake band 289 has secured thereto by rivets or other suitable means, a suitable weight member 290, so that a sufficient frictional resistance will be exerted by the brake band to the periphery of the reel during the rotary movement thereof to prevent spinning of the reel during or immediately following the intermittent feeding of the wire therefrom.

The wire, in this instance, is fed downwardly from the respective reels through suitable flexible tubular guides 291 carried by the corresponding reel-supporting rod 287 and thence through a curved tubular guide member 292 into the respective feeding device.

The guide members 292 are clamped to one end of a horizontal arm 292' secured to the top of respective feed-supporting brackets 293 which are secured by screws 294 or their equivalent to the upper face of the pleat-forming plate 185 (see Figures 18, 27, 28, 29 and 41).

The means for feeding the wire from each reel through corresponding guide members 283 consist of a pair of shouldered studs 295 and 295' secured by screws or other suitable means to the corresponding bracket 293. The studs 295 and 295' are disposed in spaced relation in horizontal planes, one above the other. Upon the outer ends of each stud is rotatably mounted respective wire-feeding wheels 296 and 296' which are secured by rivets 297 or their equivalent, to respective gears 298 and 298' to rotate therewith, said gears being in meshing engagement to transmit rotary motion from one to the other.

The periphery of the feeding wheels 296 and 296' are preferably smooth and spaced apart sufficiently for receiving the wire W therebetween and for directing its inward movement to and through respective guide members 283.

The wire feeding wheels 296 and 296' are intermittently driven in one direction by means of a ratchet 299 and pawl 300 operably mounted on the upper-positioned stud 295.

The ratchet 299 is secured by the rivets 297 to the gear 298 and wheel 296 mounted on said shaft to rotate therewith. The pawl 300 is pivotally mounted in operative engagement with the ratchet 299 upon a supporting pin 301 which is secured in the outer end of a rock arm 302 which is pivotally mounted on the stud 295 between the adjacent side of the bracket 293 and the ratchet 299. The arm 302 and pawl 300 of each of the wire-feeding devices are actuated to rotate the corresponding ratchet and feed wheels, each time the link-actuating sleeve 213 approaches the end of the downward stroke by means of bifurcated vertically disposed rods 303 which have their lower forked ends pivotally connected to respective arms 302 by the pins 301 while the upper ends 303' of the rods are cylindrical and extend upwardly through suitable openings provided in the outer ends of corresponding arms 212 connected with the sleeve 213 in a manner hereinbefore described.

The length of the ends 303' of the rods 303 is sufficient to permit the respective arms 212 to engage an enlarged head 303'' composed of a nut, or its equivalent, screw threaded or otherwise secured to the upper end of said rod just previous to the sleeve 213 reaching the limit of its upward stroke, so as to actuate the rod 303 and pawl 300 sufficiently for engaging successive teeth of the ratchet 299, and as the sleeve 213 approaches the end of its downward stroke, the arm 212 will engage the shoulder formed at the junction of the portion 303' and the forked end of the rod 303 to move said rod downwardly sufficiently to cause the intermittent rotation of the respective ratchet 299 and the consequent intermittent feeding of the wire W. In other words, each of the stapling mechanisms are provided with a wire feed mechanism adapted to be operated intermittently as the link-operating sleeve 213 approaches the end of its downward stroke through the medium of respective pawls 300 and ratchets 299 which constitute a one way drive for the corresponding wire feeding wheels 296 and 296' to cause the wires W to be fed intermittently and simultaneously through the respective guides 283 to the staple-forming and applying position within the corresponding stapling mechanism as said mechanisms are returned to their normal outermost positions following each stapling operation.

Operation

Assuming that the bottle-capping machine has just completed the capping of a bottle, or rather that the machine is in position to receive a bottle for capping, in which case the bottle carrier 54 will be at rest with one of the bottle-receiving recesses 85 in registration with the bottle lifting plunger 128 and the next previous recesses will be in registration with the bottle conveyor, as A, Figure 1. The cam shaft 8 and cams secured thereto will be positioned substantially 130 degrees rearwardly in the direction of motion from the position shown in Figures 1, 3, 4, 8, 12, 15 and 32, which will locate the lever-operating sleeve 213 intermediate its upper and lower positions on the downward stroke, which will position the stapling mechanisms near the end of the outer stroke ready to receive the staple-forming wire therein.

The bottle-operating plunger 128 will be in the lowermost position, as shown in Figures 3 and 21 and the operating arm 121 will be positioned to engage the star wheel 122 for actuating the bottle carrier 54 and the cap blank feeding plate 162 will be in the rear position in registration with the magazine 160 for receiving the lowermost paper disc contained in the magazine, as shown by dotted lines, Figure 32.

Assuming now that the motor 6 is in operation and that a series of a given size, as pint bottles ready to be capped, appear upon the conveyor A, as the foremost bottle approaches the overlapping portion of the bottle carrier 54, it will be directed into the registering bottle receiving recess 85 and into contact with the roller 61 on the rock arm 59 which will release the clutch release arm and permit the clutching engagement of the sections of the clutch 19. This will cause the cam shaft 8 to rotate and the consequential operation of the remaining portion of the mechanism. That is, the bottle carrier 54 will be actuated to move the bottle as B over the plunger 128 and as the sleeve member 213 approaches the lowermost position to feed the wires W through the respective guides 283 into the staple cut-off and forming positions, in the corresponding stapling mechanisms, and at the same time, the lowermost cap disc $a$ is carried by the feed plate 163 from the magazine 160 to a position between the head of the bottle B and the platen 188.

As the bottle comes to rest upon the plunger 128 the cam 98 will release the arm 94 permitting the spring 100 to rock the arm 89 to bring the plate 103 connected therewith into contact with the bottle B which will position the bottle firmly in contact with the bottle-supporting arms 88 of the respective bottle-receiving recess 85 and, therefore, concentric with the plunger 128 which will position the mouth of the bottle co-axial with the center of the disc $a$. In other words, the machine will then be in the position illustrated in most of the figures of the drawings with the bottle B, plunger 128, disc $a$ and platen 188, substantially co-axial.

The link actuating sleeve 213 is then in its lowermost position about to begin the upward stroke which positions the stapling mechanism in the outermost position with the staple-forming portion of the wire therein.

As the cam shaft 8 continues to rotate, the bottle-supporting plunger 128 and bottle B begins to move upwardly impinging the central portion of the cap blank $a$ between the top of the bottle and platen 188 and then forcing the blank and head of the bottle upwardly through the opening 185' in the pleat-forming plate 185 against the action of the spring 191 and thereby pleating the skirt of the cap blank and forming said skirt about the neck of the bottle, as illustrated in Figure 42.

Upon the bottle and plunger coming to rest in the uppermost position, the stapling mechanisms begin to move inwardly performing the staple severing and forming operation.

The disc feed plate 163 begins the return movement to the loading position and the cam 98 actuates the arm 94 to rock the bottle-positioning plate 103 outwardly to the inoperative position away from the bottle B. As the link actuating sleeve 213 approaches its uppermost position, the pleats $a'$ of each pair will be folded inwardly towards each other by the inward movement of the folding plates 199 which presses the pleats and the adjacent portion of the skirt of the cap firmly against the neck of the bottle.

By this time, the staples have been formed in the respective stapling mechanisms, as shown by dotted lines in Figure 30. The continued movement of the slides 256 of the stapling mechanisms releases the staples by rocking the trip levers 275 to lift the respective stapleholding plates 274, and the staples are then simultaneously driven by the action of the springs 273 and staple driving slides 270 through the registering folded pleats and clinching against the neck of the bottle by bending the ends of each of the staples inwardly towards each other, as shown more clearly in Figures 31 and 45, thereby firmly securing the skirt of the cap about the neck of the bottle, as the sleeve 213 reaches the end of its upward stroke.

The sleeve 213 now begins its return or downward stroke, which moves the stapling devices and pleat-forming plates 199 outwardly away from the neck of the bottle and then the plunger 128 and capped bottle, together with the remainder of the mechanism, are returned to their starting positions, which positions the bottom of the bottle flush with the top surface of the bed plate 2, so that as the next succeeding bottle enters the bottle-receiving recess 85 registering with the conveyor A and trips the clutch release arm 46 to connect the cam shaft 8 with the motor 6 to begin another bottle capping operation, the capped bottle will be carried away from the plunger 128 as the succeeding bottle is moved from the conveyor onto the plunger by the action of the carrier 54.

Although there is shown and particularly described the preferred embodiment of this invention, it is evident that various changes both in the details of the construction and the form and the relation of the parts thereof may readily be made without departing from the spirit of this invention, as set forth in the appended claims.

We claim:

1. A staple driving and forming mechanism comprising a body member, a staple-driving element slidably mounted in said body, a wire-holding member arranged in spaced relation to the drive element, wire cut-off means slidably mounted in the body adapted to sever the wire and bend the ends thereof about the holding member to form a staple, and means for yieldingly actuating said wire cut-off means and moving the drive element into engagement with the wire for holding the wire against the holding member during the forming of the staple.

2. A staple driving and forming mechanism comprising a body member, a staple-driving element slidably mounted in said body, a wire-holding member arranged in spaced relation to the drive element, wire cut-off means slidably mounted in the body adapted to sever the wire and bend the ends thereof about the holding member to form a staple, operating means, means including a spring actuated by the operating means for yieldingly actuating the wire cut-off means, and separate means actuated by the operating means for actuating the drive element.

3. A staple-forming and driving mechanism comprising a body member mounted for longitudinal reciprocative movement toward and from the work, a staple-driving plate slidably mounted in said body, an actuating slide, means including a spring member operably connecting the slide with the body member whereby said body member will be yieldingly moved by the action of the slide into and out of stapling engagement with the work, and separate spring-actuated means connecting the slide with the plate for moving said plate to drive the staple through the work when the body member is in engagement with said work.

4. A staple-forming and driving mechanism comprising a body member mounted for longitudinal reciprocative movement toward and from the work, a staple-driving plate slidably mounted in said body, a wire-holding plate arranged in spaced relation to the drive plate, an actuating slide, means including a spring member operably connecting the slide with the body member whereby said body member will be yieldingly moved by the action of the slide into and out of stapling engagement with the work, a trip arm connected with the wire-holding plate adapted to be actuated by said slide when the body member engages the work to move the holding plate to release the staple, and separate spring-actuated means connecting the slide with the drive plate to cause said drive plate to drive the staple through the work when released by said holding plate.

5. A staple forming and driving mechanism comprising a body member mounted for movement toward and from the work, wire cut-off and holding means mounted in the body for movement therewith including a staple driving element, actuating means for the wire cut-off and holding means including opposed spring members, and means for successively alternating the tension of said spring members to first form the staple under yielding tension and then to yieldingly operate the staple driving element.

6. A staple forming and driving mechanism comprising a body member mounted for movement toward and from the work, wire cut-off and holding means mounted in the body for movement therewith including a staple driving element, actuating means for the wire cut-off and holding means including opposed spring members, operating means for maintaining one of said spring members under tension to first form the staple under yielding pressure and then for reducing the tension of said first-mentioned spring member and increasing the tension of the second spring member to yieldingly operate the driving element.

JOHN GEORGE ROEHM.
SHERWOOD C. BLISS.